United States Patent
Modi et al.

(10) Patent No.: US 9,952,029 B2
(45) Date of Patent: Apr. 24, 2018

(54) GUIDED INSTALLATION FEEDBACK FOR AN OPENING SENSOR

(71) Applicant: Google Inc., Mountain View, CA (US)

(72) Inventors: Yash Modi, San Mateo, CA (US); Kenneth Louis Herman, San Jose, CA (US); Kristoffer John Donhowe, Mountain View, CA (US); Lawrence Au, Sunnyvale, CA (US); Kevin Charles Peterson, San Francisco, CA (US)

(73) Assignee: Google LLC, Mountain View, CA (US)

( * ) Notice: Subject to any disclaimer, the term of this patent is extended or adjusted under 35 U.S.C. 154(b) by 378 days.

(21) Appl. No.: 14/681,744

(22) Filed: Apr. 8, 2015

(65) Prior Publication Data

US 2016/0298950 A1 Oct. 13, 2016

(51) Int. Cl.
*G01R 33/09* (2006.01)
*G01B 7/14* (2006.01)
(Continued)

(52) U.S. Cl.
CPC ........... *G01B 7/14* (2013.01); *G06K 9/00671* (2013.01); *G06T 11/60* (2013.01); *G08B 13/08* (2013.01);
(Continued)

(58) Field of Classification Search
CPC ...... G01R 33/09; G01R 33/07; G01R 33/093; G01R 33/098; G01R 33/02; G01R 33/096;
(Continued)

(56) References Cited

U.S. PATENT DOCUMENTS 6,310,549 B1 10/2001 Loftin et al.
6,724,316 B2 4/2004 Addy et al.
(Continued)

FOREIGN PATENT DOCUMENTS

EP 2393071 A2 12/2011
WO WO-2015017805 A1 2/2015
WO WO-2016109411 A1 7/2016

OTHER PUBLICATIONS

Partial European Search Report dated Dec. 15, 2016 as received in Application No. 16164284.8.
(Continued)

*Primary Examiner* — Jermele M Hollington
*Assistant Examiner* — Taqi Nasir
(74) *Attorney, Agent, or Firm* — Morris & Kamlay LLP

(57) ABSTRACT

Systems and techniques are provided for guided installation feedback for an opening sensor. Detected magnetic field strengths of a magnetic field created by a magnet of an opening sensor as detected by a magnetometer sensor of the opening sensor may be received over a time period. It may be determined that there has been a change in the strength of the magnetic field created by the magnet as detected by the magnetometer sensor based on the received detected magnetic field strengths. Accelerometer data from an accelerometer disposed in the magnetometer sensor may be received. It may be determined from the accelerometer data that the magnetometer sensor was not moving and positive feedback may be provided to an installer of the opening sensor, or it may be determined from the accelerometer data that the magnetometer sensor was moving and negative feedback may be provided to the installer of the opening sensor.

29 Claims, 15 Drawing Sheets

(51) Int. Cl.
*G06K 9/00* (2006.01)
*G06T 11/60* (2006.01)
*G08B 13/08* (2006.01)
*G08B 13/196* (2006.01)
*G08B 29/18* (2006.01)
*G08B 29/22* (2006.01)

(52) U.S. Cl.
CPC ......... *G08B 13/196* (2013.01); *G08B 29/183* (2013.01); *G08B 29/22* (2013.01)

(58) Field of Classification Search
CPC .............. G01R 33/0052; G01R 33/077; G01R 33/0011; G01R 33/091
USPC ... 324/207.26, 245, 244, 246, 251, 252, 260
See application file for complete search history.

(56) References Cited

U.S. PATENT DOCUMENTS

| | | | |
|---|---|---|---|
| 8,629,777 | B2 | 1/2014 | Tramper et al. |
| 8,717,009 | B2 | 5/2014 | Tu |
| 2006/0068754 | A1 | 3/2006 | Goldfarb et al. |
| 2013/0002244 | A1* | 1/2013 | Quevy ............... G01R 33/0286 324/244 |
| 2013/0221996 | A1* | 8/2013 | Poupyrev ................. G06F 3/014 324/705 |
| 2013/0265162 | A1* | 10/2013 | Buckley .................. G08B 13/08 340/545.1 |
| 2014/0312884 | A1* | 10/2014 | Reilio ................... B66B 1/3492 324/207.11 |
| 2015/0122018 | A1* | 5/2015 | Yuen ....................... G01B 21/16 73/384 |
| 2016/0027272 | A1* | 1/2016 | Carlson ............. G08B 13/2491 340/551 |
| 2016/0165323 | A1* | 6/2016 | Hollis ..................... H04Q 9/00 340/870.16 |
| 2016/0187118 | A1* | 6/2016 | Modi ....................... G01B 7/14 340/815.45 |
| 2016/0189508 | A1* | 6/2016 | Peterson ............ G08B 13/2491 340/547 |

OTHER PUBLICATIONS

Extended European Search Report dated Mar. 24, 2017 as received in Application No. 16164284.8.

* cited by examiner

Related Art

Related Art

Related Art

Related Art

GUIDED INSTALLATION FEEDBACK FOR AN OPENING SENSOR

BACKGROUND

A sensor with a magnet and magnetometer may be used to provide an indication of whether an entry point is open or closed. The status of the entry point reported by the sensor may be used when determining what mode a security system can be put in, or whether or an alarm should be generated. For example, a security system in an armed state that receives a signal from the sensor indicating that the entry point has been opened may generate alarm, as the opening of the entry point may indicate an attempted intrusion.

The magnet and magnetometer of the sensor may be separate physical components, and may need to be installed on an entry point in a specific configuration in order for the sensor to function properly. For example, a magnet may be installed on a door frame while the magnetometer is installed on the door, with minimum and maximum distances between the install points for each physical component. If the magnet and magnetometer are not aligned correctly, or placed so that they are too close together or too far apart when the entry point is in a closed position, the sensor may not correctly detect the position of the entry point. This may result in an open entry point being detected by the sensor as closed or a closed entry point being detected by the sensor as open. Improper installation of the magnet and magnetometer may render the sensor less useful to a security system.

BRIEF SUMMARY

According to an implementation of the disclosed subject matter, detected magnetic field strengths of a magnetic field created by a magnet of an opening sensor as detected by a magnetometer sensor of the opening sensor may be received over a time period. It may be determined that there has been a change in the strength of the magnetic field created by the magnet as detected by the magnetometer sensor based on the received detected magnetic field strengths during the time period. Accelerometer data from an accelerometer disposed in the magnetometer sensor over the time period may be received. It may be determined from the accelerometer data that the magnetometer sensor was not moving during the time period and positive feedback may be provided to an installer of the opening sensor, or it may be determined from the accelerometer data that the magnetometer sensor was moving during the time period and negative feedback may be provided to the installer of the opening sensor.

An indication may be transmitted to the installer of the opening sensor to open and close an entry point on which the opening sensor is installed. Detected magnetic field strengths of the magnetic field created by the magnet of the opening sensor as detected by the magnetometer sensor of the opening sensor over a second time period may be received. It may be determined that there has been no change in the strength of a magnetic field created by the magnet as detected by the magnetometer sensor based on the received detected magnetic field strengths over the second time period. The indication to the installer of the opening sensor to open and close an entry point on which the opening sensor is installed may be re-transmitted.

An indication may be transmitted to the installer of the opening sensor to open and close an entry point on which the opening sensor is installed. A detected magnetic field strengths of the magnetic field created by the magnet of the opening sensor as detected by a magnetometer sensor of the opening sensor over a second time period may be received. It may be determined that there has been a change in the strength of a magnetic field created by the magnet as detected by the magnetometer sensor based on the received detected magnetic field strengths over the second time period. Accelerometer data from the accelerometer disposed in the magnetometer sensor over the second time period may be received. It may be determined from the accelerometer data that the magnetometer sensor was not moving during the second time period and negative feedback may be provided to an installer of the opening sensor, or it may be determined from the accelerometer data that the magnetometer sensor was moving during the time period, positive feedback may be provided to the installer of the opening sensor, and the opening sensor may be calibrated based on the detected magnetic field strengths over the second time period.

Accelerometer data from the accelerometer disposed in the magnetometer sensor may be received. An alignment of the magnetometer sensor may be determined based on the accelerometer data. Negative feedback may be provided to the installer of the opening sensor if the alignment of the magnetometer sensor is not vertical or horizontal, or positive feedback may be provided to the installer of the opening sensor if the alignment of the magnetometer sensor is vertical or horizontal.

An image including an image of entry point may be received. The location of the image of the entry point within the image and the type of entry point depicted by the image of the entry point may be identified. An overlay may be generated on the image indicating an installation location for an opening sensor on the entry point. Customized installation instructions may be generated based on the identified type of the entry point. The customized installation instructions and the image with the overlay may be transmitted.

Positive feedback may be provided only when the opening sensor is installed on a door and the magnetometer sensor is horizontally aligned, the opening sensor is installed on a window and the magnetometer sensor is vertically aligned.

The accelerometer data may include the acceleration forces experienced by the accelerometer, and the magnetometer sensor is vertically aligned when the acceleration forces experienced by the accelerometer are gravitational forces down a long axis of the magnetometer sensor, and the magnetometer sensor may be horizontally aligned when the acceleration forces experienced by the accelerometer are gravitational forces down a short axis of the magnetometer sensor.

The negative feedback may include an indication to the installer of the opening sensor to affix the magnetometer sensor and adjust the magnet. The negative feedback and the positive feedback may be provided over a computing device connected to any of the opening sensor and a smart home environment of which the opening sensor is a component. The negative feedback may include an indication that the installer of the opening sensor has installed the magnetometer sensor on a fixed portion of the entry point.

To determine that there has been a change in the strength of a magnetic field created by the magnet as detected by the magnetometer sensor based on the received detected magnetic field strengths over the second time period, it may be determined that the detected magnetic field strengths decreased over a first part of the second time period, and it may be determined that the detected magnetic field strengths increased over a second part of the second time period.

Determining that there has been a change in the strength of a magnetic field created by the magnet as detected by the magnetometer sensor based on the received detected magnetic field strengths over the second time period is may be based on a generic open/close algorithm for the entry point.

The overlay may include an indicated location on the image for the installation of the magnetometer sensor and an indicated location on the image for the installation of the magnet.

Image recognition may be performed on the image of the entry point to identify the location of the image of the entry point within the image and the type of entry point depicted by the image of the entry point further According to an embodiment of the disclosed subject matter, a means for receiving detected magnetic field strengths of a magnetic field created by a magnet of an opening sensor as detected by a magnetometer sensor of the opening sensor over a time period, a means for determining that there has been a change in the strength of the magnetic field created by the magnet as detected by the magnetometer sensor based on the received detected magnetic field strengths during the time period, a means for receiving accelerometer data from an accelerometer disposed in the magnetometer sensor over the time period, a means for determining from the accelerometer data that the magnetometer sensor was not moving during the time period, means for providing positive feedback to an installer of the opening sensor, a means for determining from the accelerometer data that the magnetometer sensor was moving during the time period, a means for providing negative feedback to the installer of the opening sensor, a means for transmitting an indication to the installer of the opening sensor to open and close an entry point on which the opening sensor is installed, a means for receiving detected magnetic field strengths of the magnetic field created by the magnet of the opening sensor as detected by the magnetometer sensor of the opening sensor over a second time period, a means for determining that there has been no change in the strength of a magnetic field created by the magnet as detected by the magnetometer sensor based on the received detected magnetic field strengths over the second time period, a means for re-transmitting the indication to the installer of the opening sensor to open and close an entry point on which the opening sensor is installed, a means for transmitting an indication to the installer of the opening sensor to open and close an entry point on which the opening sensor is installed, a means for receiving detected magnetic field strengths of the magnetic field created by the magnet of the opening sensor as detected by a magnetometer sensor of the opening sensor over a second time period, a means for determining that there has been a change in the strength of a magnetic field created by the magnet as detected by the magnetometer sensor based on the received detected magnetic field strengths over the second time period, a means for receiving accelerometer data from the accelerometer disposed in the magnetometer sensor over the second time period, a means for determining from the accelerometer data that the magnetometer sensor was not moving during the second time period, a means for providing negative feedback to an installer of the opening sensor, a means for determining from the accelerometer data that the magnetometer sensor was moving during the time period, a means for providing positive feedback to the installer of the opening sensor, a means for calibrating the opening sensor based on the detected magnetic field strengths over the second time period, a means for receiving accelerometer data from the accelerometer disposed in the magnetometer sensor, a means for determining an alignment of the magnetometer sensor based on the accelerometer data, a means for providing negative feedback to the installer of the opening sensor if the alignment of the magnetometer sensor is not vertical or horizontal, a means for providing positive feedback to the installer of the opening sensor if the alignment of the magnetometer sensor is vertical or horizontal, a means for receiving an image including an image of entry point, a means for identifying the location of the image of the entry point within the image and the type of entry point depicted by the image of the entry point, a means for generating an overlay on the image indicating an installation location for an opening sensor on the entry point, a means for generating customized installation instructions based on the identified type of the entry point, a means for transmitting the customized installation instructions and the image with the overlay, a means for determining that there has been a change in the strength of a magnetic field created by the magnet as detected by the magnetometer sensor based on the received detected magnetic field strengths over the second time period, a means for determining that the detected magnetic field strengths decreased over a first part of the second time period, a means for determining that the detected magnetic field strengths increased over a second part of the second time period, a means for identifying the location of the image of the entry point within the image and the type of entry point depicted by the image of the entry point, and a means for performing image recognition on the image of the entry point, are included Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
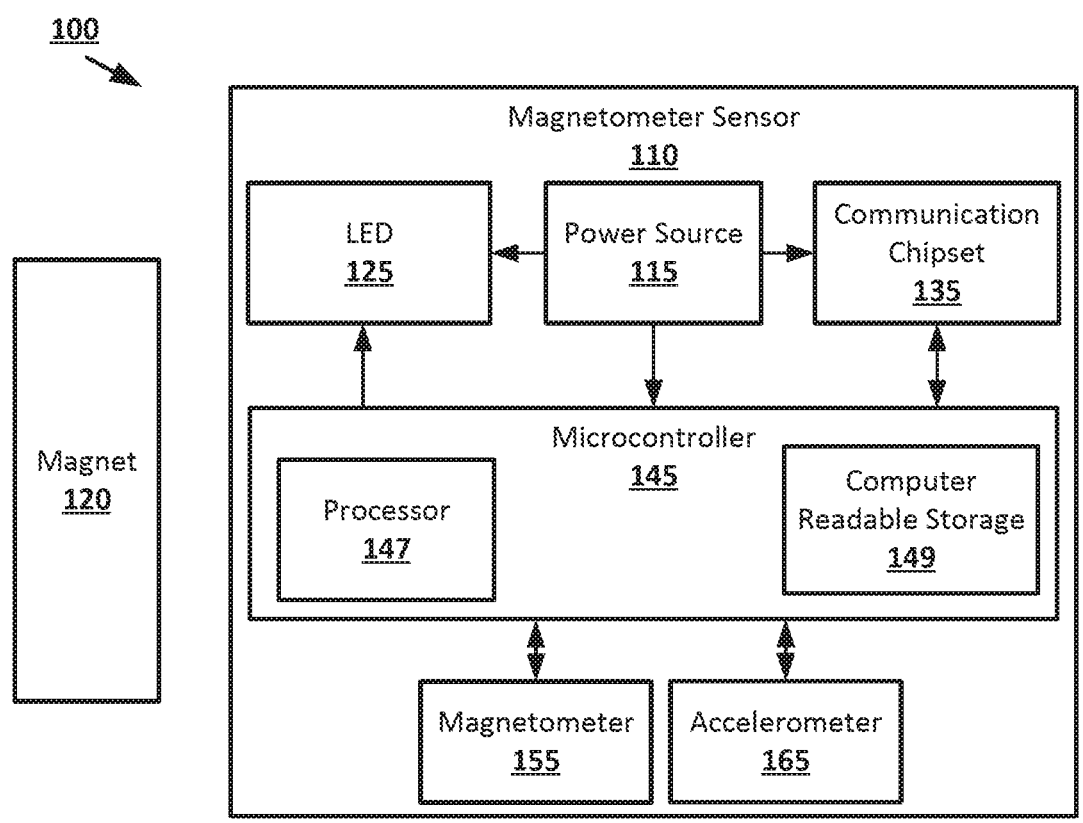
FIG. 1 shows an example system suitable for guided installation feedback for an opening sensor according to an implementation of the disclosed subject matter.

According to embodiments disclosed herein, guided installation feedback for an opening sensor may allow for the monitoring of the installation of a sensor package that may be utilized to determine the amount by which a door or window may be open or ajar as part of an intelligent security system in order to provide feedback to the installer. The sensor may include a magnetometer sensor and a magnet. The magnetometer sensor may include a magnetometer, such as a compass, which may provide an indication corresponding to the geomagnetic field and may also provide an indication that a second magnetic field is proximal to an entry point or entry point, such as a door or window of a home. For example, the compass may provide analog data that can be received by a processor. The processor may determine that the compass readings are anomalous due to the presence of a second magnetic field as compared to when there was only a single magnetic field. The compass may determine that there has been an increase in magnetic field strength and/or that there is an orientation change in the field. For example, the compass may have historically detected a single magnetic field in one location, but it may subsequently detect the presence of a second magnetic field with a different orientation from the first magnetic field. Thus, the compass may be able to determine the orientation or orientation change from a reference point of an object with which it is associated, such as a door. The opening sensor may be installed on various other entry points, such as a window that moves between an open state and a closed state. The use of a compass in combination with the accelerometer data may indicate proximity to the closed position and/or the presence of a second magnetic field.

In order for such a magnetometer to function properly, the magnetometer sensor may need to be installed at a particular distance from the magnet. The magnetometer may include a feedback device, such as one or more LEDs, which may be used to provide guided installation feedback during the installation of the magnetometer and the magnet. The distance of the magnet from the magnetometer sensor may be divided into zones relative to the magnetometer, and the feedback device may provide different indicators depending on which zone the magnet is in. This feedback may be used by a person installing the opening sensor to adjust the position of the magnet, until the magnet is an appropriate distance from the magnetometer. The functionality of the magnetometer sensor may also be adjusted based on which zone the magnet has been installed in, so that the magnetometer sensor may still be used even when the magnet is not installed at an ideal distance. During the installation, the installer may be requested to first install the magnetometer sensor, and then move the magnet until it is an appropriate distance from the magnetometer sensor, instead of installing the magnet and moving the magnetometer sensor. Data from the accelerometer in the magnetometer sensor may be used to determine if a person installing the opening sensor is moving the magnetometer sensor or the magnet during the installation, and feedback may be provided to the person to indicate if they are performing the installation correctly or incorrectly. The magnetometer sensor may also need to be installed on the moving portion of an entry point, while the magnet may need to be installed on the static portion of the entry point. The person installing the opening sensor may be requested to open and close the entry point. Data from the magnetometer and accelerometer may be used to determine whether the person both complies with the request to open and close the entry point, and if they have complied, whether the magnetometer sensor has been installed on the moving or static portion of the entry point. Feedback may be provided to the person installing the opening sensor, re-requesting that they open and close the entry point, or indicating whether the magnetometer sensor is installed on the correct portion of the entry point. Data from the accelerometer in the magnetometer sensor may also be used to provide feedback to the person installing the opening sensor indicating whether the magnetometer sensor is vertically or horizontally aligned, or has been incorrectly installed at an angle that is not vertical or horizontal.

An opening sensor may include two physical components, a magnet and a magnetometer sensor. The magnetometer sensor may include a magnetometer, which may be any suitable device for detecting a magnetic field, such as a compass, along with any other suitable sensors or devices, such as an accelerometer and a reed switch. The magnetometer sensor may also include a microcontroller with a processor for controlling the operating of the magnetometer sensor. The processor may send a request for data obtained by the compass, which can then activate into a working mode in which it can gather and send data to the processor. The working mode may be powered by a power supply such as a battery and/or at least partly from energy received in connection with the query from the processor. For example, the compass may receive power from an antenna that receives a query from a remote processor system, much as RFID devices receive and use power from queries. The compass may detect a magnetic field and send data regarding the sensed field to the processor. The processor may compare or otherwise correlate the magnetic field data received from the compass with the movement data received from the accelerometer. Based on the results of the correlation, the processor can assess changes in orientation, the degree of the movement of the door, and/or detect any inconsistencies between the data reported by the compass and data reported by another sensor type on the magnetometer sensor, such as an accelerometer.

The installation of the opening sensor may involve placing the two physical components of the opening sensor on separate parts of an entry point. For example, the magnet may be placed on the top of a door frame, while the magnetometer sensor may be placed at the top of the door, below the magnet. The magnetometer sensor and the magnet may be aligned such that the magnet is the source of the second magnetic field detected by the magnetometer. Movement of the entry point, for example, opening the door, may result in the strength of the second magnetic field as detected by the magnetometer changing, for example, growing weaker as the door is opened further and the magnetometer sensor moves farther from the magnet. A compass-style magnetometer may also detect a change in the apparent orientation of the second magnetic field.

The distance between the magnet and the magnetometer sensor, along with the strength of the magnet and the sensitivity of the magnetometer in the magnetometer sensor, may influence data on magnetic field and/or the orientation reported by the magnetometer sensor and the functionality of the opening sensor. For example, if the magnetometer sensor is installed too close to the magnet, the magnetometer may be saturated. A saturated magnetometer may not detect when the entry point is opened slightly, and/or may not detect a change in the strength of the second field until the magnetometer is moved beyond some minimum distance away from the magnet so that it is no longer saturated, as the saturated magnetometer may register the same strength for the second magnetic field, the saturation strength, at every point until the minimum distance is passed. This minimum distance may be greater than the distance at which it may be desirable for the magnetometer to detect movement of the entry point through a decrease in the strength of the second magnetic field. Additionally, placing the magnet too close to the magnetometer may make it easier for a potential intruder to defeat the opening sensor may placing a strong magnet close to the magnetometer sensor. A saturated magnetometer may be used by an opening sensor to monitor the entry point, but the magnetometer may need to be calibrated differently than it would be for use in a non-saturated configuration. If the magnetometer sensor is installed too far from the magnet, the magnetometer may not detect the second magnetic field from the magnet at all. This may render the opening sensor non-functional, as the magnetometer may not be able to detect changes in the strength of the second magnetic field when the entry point moves, so the magnetometer may not detect movement of the entry point.

There may be distances between those at which saturation from the second magnetic field occurs, and at which the second magnetic field is not detected. Such distances may have varying levels of optimality for the placement of the magnet. For example, the magnet may be placed at a distance from the magnetometer that may be closer to the distance at which the second magnetic field is not detected than to the distance at which the magnetometer is saturated. This placement of the magnet may be sub-optimal, but the opening sensor may partially function. At such a distance, partial opening of the entry point may be indistinguishable from full opening of the entry point to the magnetometer sensor. Thus, the opening sensor may only be able to determine whether the entry point is open or closed, and may not be able to determine degrees of partial openness. This may result in the opening sensor functioning in a binary mode, as any partial opening of the entry point may be detected by the magnetometer sensor as a full opening of the entry point.

There may be an optimal distance or range of distances at which the magnet can be placed relative to the magnetometer sensor at which the opening sensor may be fully functional. This distance may be, for example, closer to the distance at which the magnetometer is saturated by the second magnetic field than to the distance at which the magnetometer does not detect the second magnetic field at all. At such a distance, the opening sensor may be able to detect not only whether the entry point is open or closed, but the degree to which the entry point is open. The magnetometer sensor may be able to distinguish between, for example, a door that is one-tenth open, with the door forming a 9 degree angle with the door frame, and a door that is fully open, with the door forming a 90 degree or greater angle with the door frame.

The magnetometer sensor may include a feedback device to guide installation of the magnet and the magnetometer sensor. The feedback device may be, for example, an LED, an array of LEDS, a display screen, a speaker, or any suitable device for providing feedback to a person installing the opening sensor. For example, the magnetometer may include one or more LEDs that may provide various indicators, such as red, green, and/or yellow light. The LED may be located on the body of the magnetometer sensor such that it may be visible to a person attempting to install the magnetometer sensor on an entry point.

The feedback device on the magnetometer sensor may provide feedback on the suitability of the distance between the magnetometer sensor and the magnet for optimal functionality of the opening sensor. The magnetometer may be active in the magnetometer sensor during the installation process. The magnetometer may detect the strength of the second magnetic field, for example, continually, or based on requests from the processor or a timer, and report the detected strength to the processor. The processor may use the detected strength to determine the relative distance between the magnet and the magnetometer. The relative distance may be an indication of whether the magnet is too close or too far from the magnetometer sensor, and if the magnet is too far, whether the magnet is too far for the second magnetic field to be detected, or only too far for the magnetic sensor to properly detect partial opening of the entry point. The relative distance may be directly associated with the detected strength of the second magnetic field. This determination of relative distance may be used by the processor to control the feedback device, providing feedback to the person installing the magnet. The person installing the magnet may wait to affix the magnet until the feedback device provides feedback indicating that the magnet is an optimal distance from the magnetometer given any limitations governing the installation, such as areas where the magnet or magnetometer cannot be affixed due to, for example, aesthetics or materials or surfaces involved.

For example, the processor may cause an LED on the magnetometer sensor to blink yellow when the magnet has been placed too close to the magnetometer sensor. The LED blinking yellow may indicate that the magnetometer, for example, the compass, is saturated. The processor may cause the LED to show solid red when the magnet has been placed too far from the magnetometer sensor. The LED showing solid red may indicate that the magnetometer cannot detect the second magnetic field from the magnet. The processor may cause the LED to show solid yellow when the magnet has been placed at a distance from magnetometer sensor where partial opening of the entry point cannot be detected properly, and the opening sensor will only be able to determine if the entry point is open or closed. The LED showing solid yellow may indicate that the magnetometer can detect the second magnetic field and is not saturated, but is far enough from the magnet that movement of the moving portion of the entry point will cause the detected strength of the second magnetic field to drop rapidly, preventing the magnetometer sensor from distinguishing partial opening of the entry point from full opening of the entry point. The processor may cause the LED to show solid green when the magnet has been placed at an optimal distance from the magnetometer sensor. The LED showing solid green may indicate that the magnetometer can detect the second magnetic field, is not saturated, and is close enough to detect smaller changes in the strength of the magnetic field when the moving portion of the entry point moves. The person installing the opening sensor may wait until they have found a position for the magnet relative to the magnetometer sensor that causes the LED of the magnetometer sensor to show solid green before affixing the magnet or magnetometer sensor.

During the installation process, the indications output by the feedback device may change as the person installing the opening sensor moves either the magnet or the magnetometer sensor. For example, the magnetometer sensor may be affixed to the top of a door. The person installing the opening sensor may then place the magnet against the door frame at any position aligned vertically with the magnetometer sensor. The magnetometer may detect the strength of the second magnetic field, and the processor may use the detected strength to determine the relative distance between the magnet and the magnetometer. The processor may cause the LED to indicate this relative distance. For example, the LED may show solid red, indicating that the person installing the opening sensor has placed the magnet too far from the magnetometer sensor. The person installing the opening sensor may see the LED showing solid red, and may begin to move the magnet closer to the magnetometer sensor. If the person installing the opening sensor moves the magnet too close to the magnetometer sensor, the LED may switch from showing solid red to blinking yellow. The person installing the opening sensor may then move the magnet further away from the magnetometer sensor, until the LED begins to show solid green, at which point they may affix the magnet at its current position. If, for example, the person installing the opening sensor moves the magnet too far from the magnetometer again, the LED may show solid yellow, which may indicate to the person that they have moved the magnet too far and need to start moving it back towards the magnetometer sensor. In this way, the feedback device, such as the LED, of the magnetometer sensor may be used to guide the positioning of the magnet and the magnetometer sensor relative to each other.

To properly install an opening sensor, the magnetometer sensor may need to be affixed to the entry point first, and then the position of the magnet may be adjusted until the magnet is at the most optimal available distance from the magnetometer sensor before the magnet is affixed. To ensure that the person installing the opening sensor has affixed the magnetometer sensor and is adjusting the magnet, rather than affixing the magnet and adjusting the magnetometer sensor, or affixing neither and adjusting both concurrently, feedback may be provided to the person based on data from the magnetometer and the accelerometer in the magnetometer sensor.

The magnetometer may be used to determine whether either of the magnetometer sensor or the magnet is being moved. Fluctuations in the magnetic field strength detected by the magnetometer may indicate that the person installing the opening sensor is adjusting the position of either the magnetometer sensor or the magnet. The determination as to whether the fluctuations in the magnetic field strength at the magnetometer indicate motion may be made by the magnetometer sensor, or may be made by a computing device, such as a hub computing device or controller that may be part of a smart home environment.

When it has been determined that the either the magnetometer sensor or the magnet is being moved, the accelerometer of the magnetometer sensor may be used to determine which of the magnetometer sensor or the magnet is being moved. For example, if the accelerometer of the magnetometer sensor reports no motion, then it may be determined that the magnet is being moved, while the magnetometer sensor is fixed. Positive feedback may be provided to the person installing the opening sensor, indicating that they are installing the opening sensor correctly. If the accelerometer reports motion, then it may be determined that the magnetometer sensor is being adjusted. Negative feedback may be provided to the person installing the opening sensor, indicating that they are installing the opening sensor incorrectly.

Feedback may be provided to the person installing the opening sensor in any suitable manner. For example, the feedback device the magnetometer sensor, such as an LED, may be used to provide the positive feedback in a way that may be distinguishable from the feedback provided regarding the distance between the magnetometer sensor and the magnet. The feedback may also be provided through a buzzer or vibrating device within the magnetometer sensor, a smartphone, tablet, smart watch, or other computing device including a screen or a speaker that is accessible to the person installing the open sensor and paired to the smart home environment, or directly to the opening sensor, through any suitable wired or wireless connection, or a speaker that may be connected to the smart home environment. The feedback may provide an indication to the person installing the opening sensor as to whether they are performing the installation correctly, and may also provide instructions if they are performing the installation incorrectly.

A properly installed opening sensor may have the magnetometer sensor affixed to a moving portion of an entry point. For example, the magnetometer sensor may need to be affixed to a door within a door frame, or to a moving portion of a window that slides, tilts, or opens. The magnet may be affixed to a static portion of the entry point. For example, the magnet may be affixed to a door frame, a window frame, or another non-moving portion of a window. In an improper installation, the magnet may be affixed to the moving portion of the entry point, while the magnetometer sensor is affixed to the static portion.

When the person installing the opening sensor has affixed both the magnetometer sensor and the magnet to the entry point, they may be requested to open and close the entry point. For example, the person may be asked to open and close a door, or slide open and then slide closed a sliding window. The request may be made in any suitable manner, for example, using speakers connected to the smart home environment or a screen connected to the smart home environment such as a smartphone, tablet, smartwatch, laptop, controller, or hub computing device.

After the request is made, the magnetometer of the magnetometer sensor may be monitored to detect a change in the strength of the detected magnetic field. If no change in the magnetic field strength is detected, the person may not have opened and closed the entry point, and the request may be repeated. If a change in the magnetic field strength is detected, this may indicate that the person has opened the door. The opening sensor may not be calibrated for the particular entry point on which it has been installed, so a generic open/close algorithm may be used to determine if changes in detected magnetic field strength reported by the magnetometer indicate an opening and closing of the entry point or were caused otherwise, for example, by natural fluctuations in the magnetic field from the magnet, an imprecision of the magnetometer in the magnetometer sensor, or a disturbance of the magnet or the magnetometer sensor not caused by the opening and closing of the entry point. The determination as to whether the entry point was opened and closed may be made by the opening sensor itself, or by another computing device, such as the hub computing device or controller of the smart home environment.

Once it has been determined that the entry point was opened and closed, the accelerometer of the magnetometer sensor may be used to determine whether the magnetometer is sensor is affixed to the moving or static portion of the entry point. If the magnetometer sensor is affixed to the moving portion of the entry point, for example, the door, the accelerometer may report motion over the same time period that the magnetometer reported changes in the detected magnetic field strength that corresponded to the opening and closing of the door. Positive feedback may be provided to the person, indicating that they have installed the opening sensor correctly, and the detected magnetic field strengths from the magnetometer during the time period where the door was opened and closed may be used to better calibrate the opening sensor. If the magnetometer sensor is affixed to the static portion of the entry point, for example, the door frame, the accelerometer may report no motion over the same time period that the magnetometer reported changed in the detected magnetic field strength that corresponded to the opening and closing of the door.

The magnetometer sensor of the opening sensor may need to be aligned either vertically or horizontally in order to function optimally. For example, if the magnetometer sensor is affixed to the top of a door, the magnetometer sensor may function best when it is parallel to the floor. If the magnetometer sensor is affixed to the side of sliding window, the magnetometer sensor may function best when it is perpendicular to the floor. The magnetometer and accelerometer of the magnetometer sensor may be used to determine if the magnetometer sensor is properly aligned vertically or horizontally, or if it is tilted. For example, data from the accelerometer on the acceleration forces experienced by the magnetometer sensor may be used to determine the tilt of the magnetometer sensor, based on the direction of the force of gravity on the accelerometer when the magnetometer sensor is not being moved. Feedback may be provided to the person installing the opening sensor, indicating the orientation, tilt, and vertical and horizontal alignment of the magnetometer sensor during the installation. The feedback may be provided on any suitable device. For example, the feedback device on the magnetometer sensor may be an LED, which may display green when the magnetometer sensor is properly aligned and yellow when the magnetometer sensor is not properly aligned.

In some implementations, installation instructions for the opening sensor may be provided based on a picture of the entry point. For example, before installing an opening sensor, the person may take picture, using, for example, as smartphone camera or other camera connected to the smart home environment. The picture may be uploaded to a computing device, such as a controller or hub computing device, of the smart home environment. The image of the entry point in the picture may be recognized using any suitable image recognition techniques. For example, the entry point may be recognized as a door or window, and may further be recognized as a specific type of door or window, such hinged window, sliding or roll up window, French door, and so on.

Once the entry point in the picture has been recognized, a customized set of instructions for installing the opening sensor on the entry point may be generated. The customized instructions may include, for example, an image overlay indicating the installation position for the opening sensor on the entry point. The instructions may also include step-by-step instructions to be followed by the person installing the opening sensor. The instructions be any suitable combination of images, text, and sound, and may be displayed on any suitable screen and played back over any suitable set of speakers, such as, for example, those on a smartphone used by the person installing the open sensor, or any other screen or speakers connected to the smart home environment and near the entry point.

Other sensors, of any suitable sensor type, may be used to determine if the magnet and magnetometer sensor are being installed correctly by an installer, so that appropriate positive or negative feedback may be provided. For example, cameras, optical sensors, infrared sensors, range-finding sensors including lasers, or any other sensor type may be used to determine the position and movement of the magnetometer sensor and magnet. The sensors may be located on the magnetometer sensor or magnet, or may be external. For example, an external video camera may view the installation of the magnet and magnetometer sensor, and may use image recognition or other suitable techniques to determine if, for example, the magnetometer sensor is being moved after the magnet has been fixed, the entry point is opened and closed when requested, or the magnetometer sense is properly aligned vertically or horizontally.

FIG. 1 shows an example system suitable for guided installation of an opening sensor according to an implementation of the disclosed subject matter. An opening sensor 100 may include two separate physical components, a magnetometer sensor 110 and a magnet 120. The magnetometer sensor 110 may include a microcontroller 145 for a magnetometer 155 and an accelerometer 165, a power source 115, and a transceiver (e.g., using radio or another communications medium) represented by the communication chipset 135. The communication chipset may refer to hardware suitable for wired and/or wireless communications such as an Ethernet connection. The microcontroller 145 may include a processor 147, a computer readable memory 149 that may be programmed with computer readable code. The microcontroller 145 may receive instructions (which may include configuration information and activation signals) from a controller, for example, controller 73 as described in FIG. 11, and/or a remote system such, for example, remote system 74 as described in FIG. 11. Similarly, the microcontroller 145 may communicate data generated by the magnetometer 155, and other sensors that may be part of the magnetometer sensor 110, such as, for example, an accelerometer 165 or a reed switch, to the controller 73 and/or the remote system 74 via the communication chipset 135. The magnetometer sensor 110 may refer to the magnetometer 155, microcontroller 145, power source 115, the LED 125, and the communication chipset 135 some or all of which may be disposed in a single physical unit. The magnetometer sensor 110 may receive power from any suitable power source 115, such as, for example, a lithium battery, an electrical outlet, or a wireless power supply. The magnet 120 may be a permanent magnet of any suitable material inside of a housing of any suitable material that may not interfere with the magnetic field produced by the magnet. When installed, the magnet 120 may be oriented so that a line between the north and south poles of the permanent magnet would be oriented parallel to border in between the magnet 120 and the magnetometer sensor 110.

Figure 2:
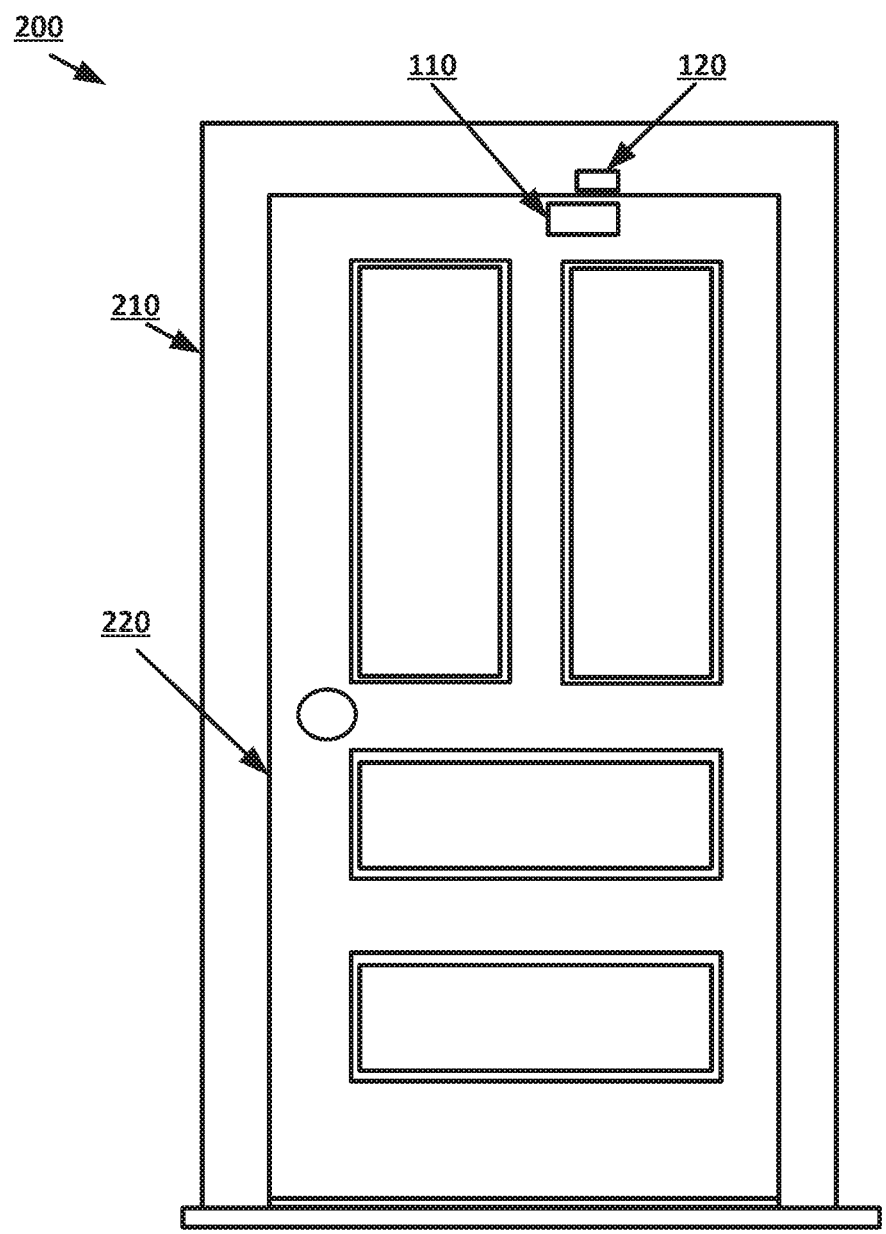
FIG. 2 shows an example installation using guided installation feedback for an opening sensor according to an implementation of the disclosed subject matter.

FIG. 2 shows an example installation using guided installation feedback for an opening sensor according to an implementation of the disclosed subject matter. The opening sensor 100 may be installed at an entry point 200, which may include a door 220 installed in a door frame 210. The entry point 200 may be an interior entry point, for example, between rooms in a house, or an exterior entry point, for example, between the inside of a house and an outdoor area. The magnetometer sensor 110, including the magnetometer 155 and other sensors, such as an accelerometer, may be affixed to the inside of the door 220 in any suitable manner, such as, for example, using touch fasteners, tape, adhesive, or fastening mechanisms such as screws or bolts. The magnetometer sensor 110 may be affixed at any suitable point on door 220, including, for example, at the top of the door 220. The magnet 120 may be affixed to the door frame 210 in any suitable position near where the magnetometer sensor 110 is affixed to the door 220. For example, if the magnetometer sensor 110 is affixed to the top of the door 220, the magnet 120 may be affixed to the top of the door frame 210 at a position vertically aligned with the magnetometer sensor 110. If the magnetometer sensor 110 is affixed to the side of the door 220, for example, the side from which the door 220 opens, the magnet 120 may be affixed to the door frame 210 and horizontally aligned with magnetometer sensor 110. The magnetometer 155, which may be, for example, a compass, may sense the magnetic field generated by the magnet 120. When the door 220 opens, the magnetometer 155 may become more distal to the magnet 120 and may sense a weaker magnetic field from the magnet 120. As the door 220 closes, the magnetometer 155 may become closer to the magnet 120 and sense a magnetic stronger field. Various implementations disclosed herein can use sensor data relating to a specific motion (or lack thereof), orientation, change in motion or orientation and rates of change in motion and/or orientation. For example, the magnetometer sensor 110 may include the accelerometer 165 which may generate data regarding motion of the magnetometer sensor 110. Data from an accelerometer 165 may be used, for example, to determine if a change in the strength of the magnetic field detected by the magnetometer 155 is due to motion of the magnetometer sensor 110 or motion of the magnet 120 or interference from a material or another magnet's magnetic field.

Figure 3:
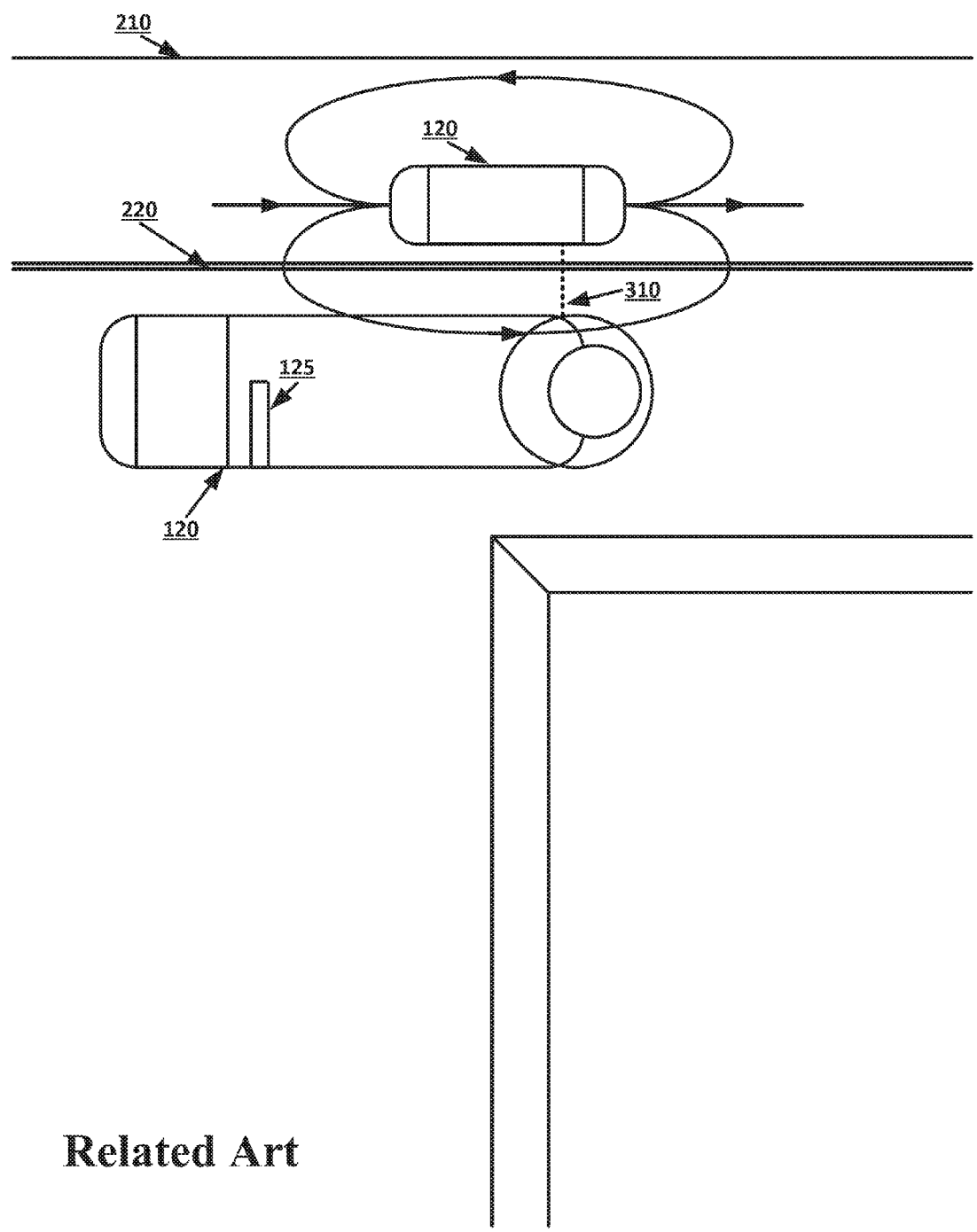
FIG. 3 shows an example installation using guided installation feedback for an opening sensor according to an implementation of the disclosed subject matter.

FIG. 3 shows an example installation using guided installation feedback for an opening sensor according to an implementation of the disclosed subject matter. The magnetometer sensor 110, including LED 125, may be placed at the top of the door 220, so that the LED 125 may face outwards and be visible to a person installing the magnetometer sensor 110. The magnet 120 may be installed on the door frame 210, vertically aligned with the magnetometer sensor 110. A line between the north and south poles of the magnet 120 may be parallel with the border between the magnet 120 and the magnetometer sensor 110, for example, parallel with the top of the door 220. The magnetic field of the magnet 120 may be detected by the magnetometer 155 of the magnetometer sensor 110 if the magnet 120 and the magnetometer sensor 110 are placed close enough together. Both the magnet 120 and the magnetometer sensor 110 may be affixed to the door frame 210 and the door 220 in any suitable manner.

Figure 4:
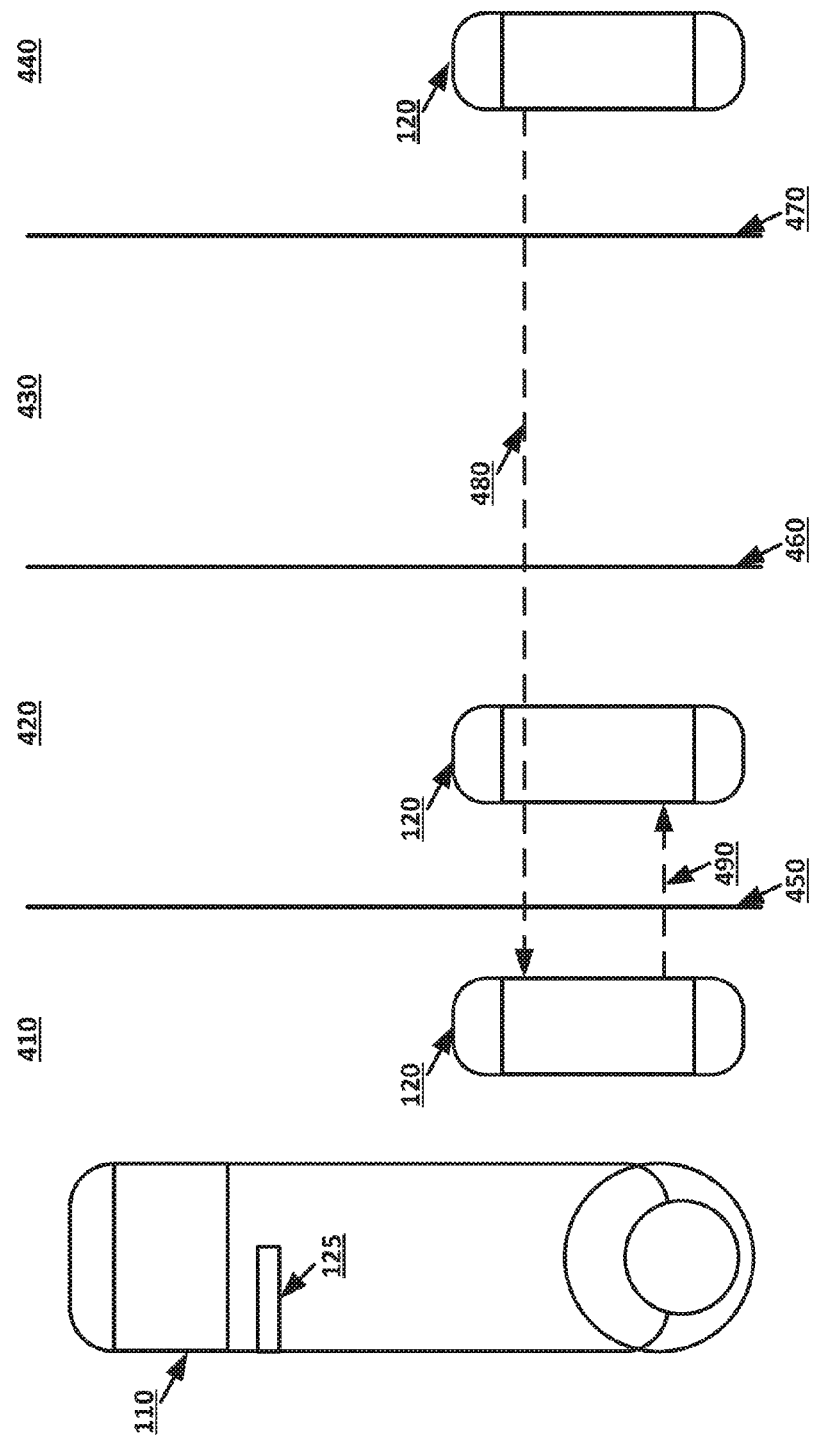
FIG. 4 shows an example of installation positions using guided installation feedback for an opening sensor according to an implementation of the disclosed subject matter.

FIG. 4 shows an example of installation positions using guided installation feedback for an opening sensor according to an implementation of the disclosed subject matter. The relative distance from the magnetometer sensor 110 to the magnet 120 may determine the functionality of the opening sensor 100. A first zone 410 may be in between the magnetometer sensor 110 and a first threshold 450. If the placement of the magnet 120 relative to the magnetometer sensor 110 falls within the first zone 410, with the distance between the magnetometer sensor 110 and the magnet 120 being less than the distance between the magnetometer sensor 110 and the first threshold 450, then the magnetometer 155 may be saturated by the magnetic field of the magnet 120. The opening sensor 100 may be able to detect partial opening of the entry point, but may require calibration. Without calibration, a reed switch may be used instead of the magnetometer 155 to monitor the opening and closing of the entry point. The first threshold 450 may be, for example, 25 mm from the magnetometer sensor 110.

A second zone 420 may be in between the first threshold 450 and a second threshold 460. If the placement of the magnet 120 relative to the magnetometer sensor 110 falls within the second zone 420, with the distance between the magnetometer sensor 110 and the magnet 120 being greater than the first threshold 450 and less than the second threshold 460, then the magnetometer 155 may be not be saturated by the magnetic field of the magnet 120. The magnetometer 155 may be able detect changes in the strength of the magnetic field from the magnet 120 with enough precision that the magnetometer sensor 110 may be able to determine varying degrees of partial openness of an entry point and distinguish partial openness from full openness. The opening sensor 100 may be able to report the varying degrees of partial openness of the entry point after proper calibration.

A third zone 430 may be in between the second threshold 460 and a third threshold 470. If the placement of the magnet 120 relative to the magnetometer sensor 110 falls within the third zone 430, with the distance between the magnetometer sensor 110 and the magnet 120 being greater than the second threshold 460 and less than the third threshold 470, then the magnetometer 155 may be not be saturated by the magnetic field of the magnet 120, which may be detected as weak by the magnetometer 155. The magnetometer 155 may be able detect changes in the strength of the magnetic field from the magnet 120, but not with enough precision that the magnetometer sensor 110 may be able to determine varying degrees of partial openness of an entry point and distinguish partial openness from full openness. For example, the magnetic field from the magnet 120 may be weak enough that any opening of the entry point, increasing the distance between the magnetometer 155 and the magnet 120, may cause the magnetometer 155 to be unable to detect the magnetic field from the magnet 120 at all. The opening sensor 100 may be able to report whether the entry point is open or closed after proper calibration, but may not be able to report varying degrees of partial openness. Any opening of the entry point detected by the magnetometer sensor 110, from slightly open to fully open, may be reported the same way by the opening sensor 100.

A fourth zone 440 may be beyond the third threshold 470. If the placement of the magnet 120 relative to the magnetometer sensor 110 falls within the third zone 430, with the distance between the magnetometer sensor 110 and the magnet 120 being greater than the third threshold 470, then the magnetometer 155 may not be able to detect the magnetic field from the magnet 120. The magnetometer 155 may be unable to detect the magnetic field from the magnet 120 at all, as the strength of the magnetic field from the magnet 120 at the location of the magnetometer sensor 110 may near or at zero. The opening sensor 100 may be unable to report on the status of the entry point, as the inability of the magnetometer 155 to detect the magnetic field from the magnet 120 may prevent the magnetometer sensor 110 from determining whether the entry point is opened or closed.

The distances of the first threshold 450, the second threshold 460, and the third threshold 470 from the magnetometer sensor 110 may be based on the strength of the magnet 120 and the sensitivity of the magnetometer 155. For example, a stronger magnet 120 may create a stronger magnetic field, which may cause the first threshold 450 to be farther from the magnetometer sensor 110 than it would be were the magnet 120 weaker.

During installation of the opening sensor 100, proper installation may require that the magnetometer sensor 110 be affixed and the magnet 120 be adjusted until it is at an optimal distance from the magnetometer sensor 110. The magnetometer 155 may detect the strength of the magnetic field from the magnet 120 fluctuating as the magnet 120 is moved, for example, from the fourth zone 440 along path 480 to the first zone 410, and from the first zone 410 along the path 490 to the second zone 420. The fluctuation in the strength of the magnetic field as detected by the magnetometer 155 may be correlated with data from the accelerometer 165, which may indicate that the magnetometer sensor 110 is not moving. This may indicate that the installation is being performed correctly, as the magnetometer sensor 110 may be affixed to the entry point 200 while the magnet 120 is moved to an optimal position before being affixed to the entry point 200. Positive feedback may be provided to the person installing the opening sensor 100, for example, through the LED 125 or other feedback device on the magnetometer sensor 110, or through a computing device or speaker connected to the opening sensor 100 or a smart home environment.

Figure 5:
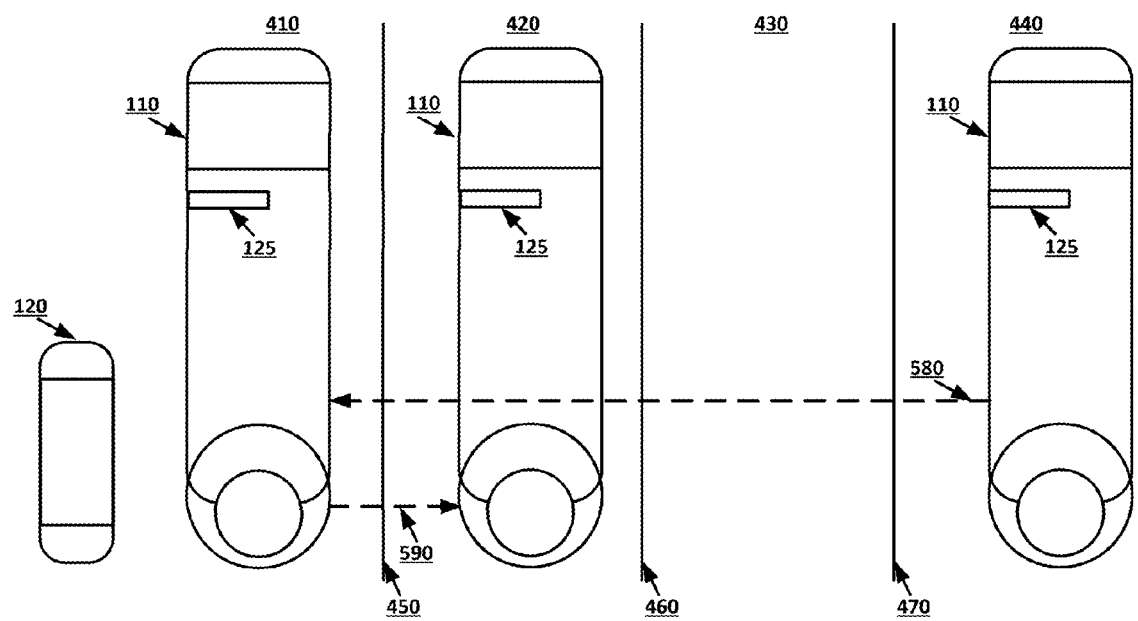
FIG. 5 shows an example of installation positions using guided installation feedback for an opening sensor according to an implementation of the disclosed subject matter.

FIG. 5 shows an example of installation positions using guided installation feedback for an opening sensor according to an implementation of the disclosed subject matter. During installation of the opening sensor 100, proper installation may require that the magnetometer sensor 110 be affixed and the magnet 120 be adjusted until it is at an optimal distance from the magnetometer sensor 110. The magnetometer 155 may detect the strength of the magnetic field from the magnet 120 fluctuating as the magnetometer sensor 110 is moved, for example, from the fourth zone 440 along path 580 to the first zone 410, and from the first zone 410 along the path 590 to the second zone 420. The fluctuation in the strength of the magnetic field as detected by the magnetometer 155 may be correlated with data from the accelerometer 165, which may indicate that the magnetometer sensor 110 is moving. This may indicate that the installation is being performed incorrectly, as the magnet 120 may be affixed to the entry point 200 while the magnetometer sensor 110 is moved to an optimal position before being affixed to the entry point 200. Negative feedback may be provided to the person installing the opening sensor 100, for example, through the LED 125 or other feedback device on the magnetometer sensor 110, or through a computing device or speaker connected to the opening sensor 100 or a smart home environment. The negative feedback may include an indication to the person installing the opening sensor 100 that they have incorrectly affixed the magnet 120 before affixing the magnetometer sensor 110, and may provide steps the person may take to correct the error.

Figure 6A:
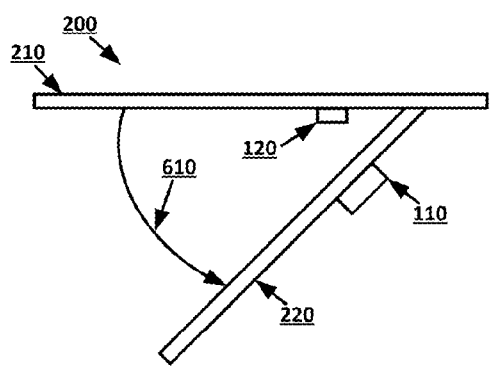
FIGS. 6A and 6B show an examples of an open entry point using guided installation feedback for an opening sensor according to an implementation of the disclosed subject matter.
Figure 6B:
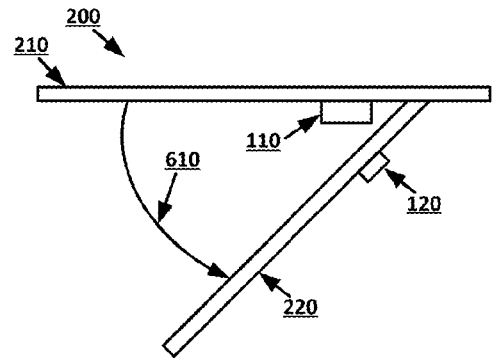

FIGS. 6A and 6B show an examples of an open entry point using guided installation feedback for an opening sensor according to an implementation of the disclosed subject matter. Proper installation of the opening sensor 100 may require the magnetometer sensor 110 be affixed to a moving portion of the entry point 200, while the magnet 120 is affixed to a static portion of the entry point 200. After the magnetometer sensor 110 and the magnet 120 have been affixed to the entry point 200, the person installing the opening sensor 100 may be requested to open and close the entry point 200. The request may be made in any suitable manner, such as, for example, through any speaker or screen connected to the opening sensor 100 or the smart home environment. The opening and closing of the entry point 200 may be confirmed using the magnetometer 155, which may experience a decrease in the detected strength of the magnetic field of the magnet 120 as the door is opened and the magnetometer sensor 110 is moved away from the magnet 120, and an increase in the detected strength of the magnetic field as the door is closed.

If the magnetometer 155 does not report a change in the strength of the detected magnetic field after the request to open and close the entry point 200 is made, this may indicate that the person has not opened and closed the entry point 200. This determination may be made based on a generic open/close algorithm, as the opening sensor 100 may not yet be calibrated for the entry point 200. The request to open and close the entry point 100 may be repeated.

If the magnetometer 155 reports a change in the detected strength of the magnetic field from the magnet 120 that is indicative of the entry point 200 being opened and closed, the accelerometer 165 may be checked to determine if any motion was detected during the time period in which the strength of the magnetic field was fluctuating. If the accelerometer 165 detected motion during the time period in which the strength of the magnetic field fluctuated as the entry point 200 was opened and closed, this may indicate that the magnetometer sensor 110 has been affixed to the moving portion of the entry point 200. For example, as in FIG. 6A, the magnetometer sensor 110 may be affixed to the door 220, while the magnet 120 may be affixed to the door frame 210. When the door 220 is opened along path 610, the magnetometer 155 may detect the strength of the magnetic field from the magnet 120 decreasing and the accelerometer 165 may detect the motion of the magnetometer sensor 110 as it moves with the door 220. Positive feedback may be provided to the person installing the opening sensor 100, indicating that they have installed the magnetometer sensor 110 and the magnet 120 on the correct portions of the entry point 200. Data from the magnetometer 155 during the opening and closing of the entry point 200 may be used to calibrate the opening sensor 100 for the entry point 200.

If the accelerometer 165 does not detect motion during the time period in which the strength of the magnetic field fluctuated as the entry point 200 was opened and closed, this may indicate that the magnetometer sensor 110 has been affixed to the static portion of the entry point 200. For example, as in FIG. 6B, the magnetometer sensor 110 may be affixed to the door frame 210, while the magnet 120 may be affixed to the door 220. When the door 220 is opened along the path 610, the magnetometer 155 may detect the strength of the magnetic field from the magnet 120 decreasing, but the accelerometer 165 may not detect any motion of the magnetometer sensor 110, as the magnet 120 may move with the door 220 while the magnetometer sensor 110 remains still on the door frame 210. Negative feedback may be provided to the person installing the opening sensor 100, indicating that they have installed the magnetometer sensor 110 and the magnet 120 on the incorrect portions of the entry point 200.

Figure 7:
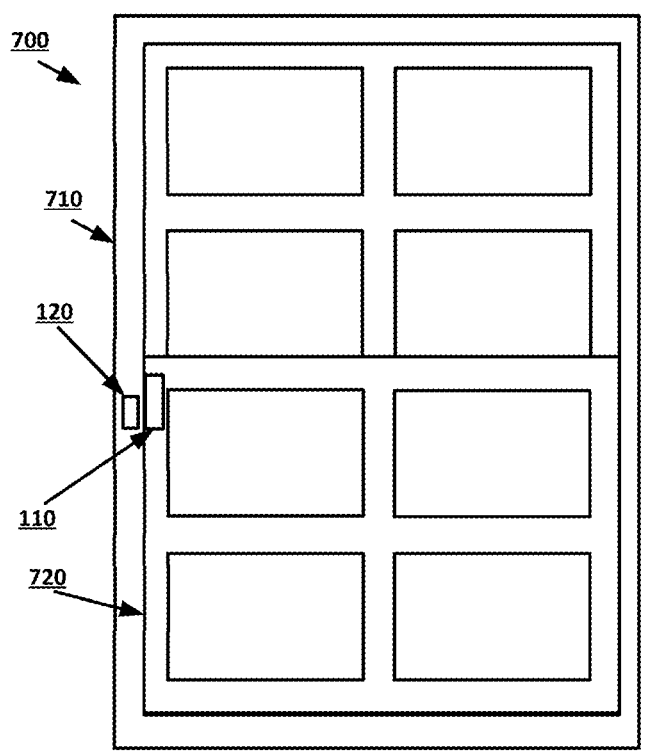
FIG. 7 shows an example installation using guided installation feedback for an opening sensor according to an implementation of the disclosed subject matter.

FIG. 7 shows an example installation using guided installation feedback for an opening sensor according to an implementation of the disclosed subject matter. The opening sensor 100 may be installed on a window 700, which may include window frame 710 and sliding window 720. To properly install the opening sensor 100 on the window 700, the magnetometer sensor 110 may be affixed to the sliding window 720, aligned horizontally with the magnet 120 affixed to the window frame 710.

Figure 8A:
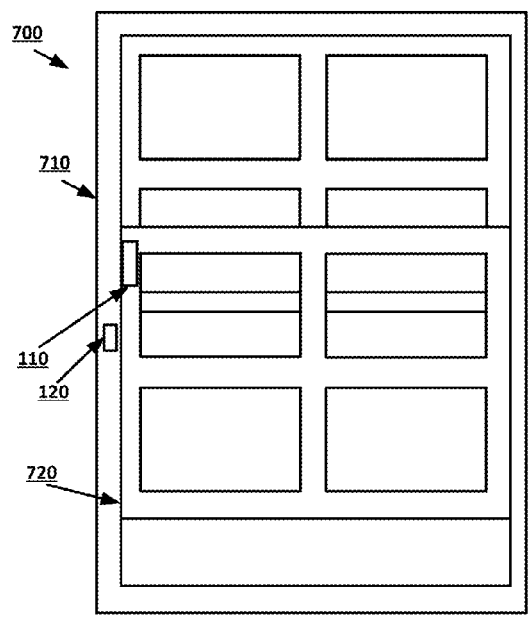
FIGS. 8A and 8B show an examples of an open entry point using guided installation feedback for an opening sensor according to an implementation of the disclosed subject matter.
Figure 8B:
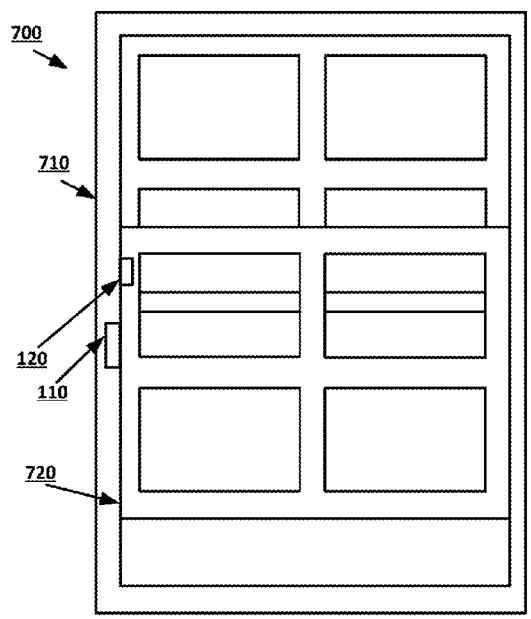

FIGS. 8A and 8B show an examples of an open entry point using guided installation feedback for an opening sensor according to an implementation of the disclosed subject matter. The person installing the opening sensor 100 on the window 700 may be requested to open and close the window, to determine if the magnetometer sensor 110 has been affixed to the correct portion of the window 700. For example, as in FIG. 8A, the magnetometer sensor 110 may be affixed to the sliding window 720, while the magnet 120 may be affixed to the window frame 710. When the sliding window 720 is opened, the magnetometer 155 may detect the strength of the magnetic field from the magnet 120 decreasing and the accelerometer 165 may detect the motion of the magnetometer sensor 110 as it moves with the sliding window 720. Positive feedback may be provided to the person installing the opening sensor 100, indicating that they have installed the magnetometer sensor 110 and the magnet 120 on the correct portions of the window 700. Data from the magnetometer 155 during the opening and closing of the window 700 may be used to calibrate the opening sensor 100 for the window 700.

If the accelerometer 165 does not detect motion during the time period in which the strength of the magnetic field fluctuated as the window 700 was opened and closed, this may indicate that the magnetometer sensor 110 has been affixed to the static portion of the window 700. For example, as in FIG. 8B, the magnetometer sensor 110 may be affixed to the window frame 710, while the magnet 120 may be affixed to the sliding window 720. When the sliding window 720 is opened, the magnetometer 155 may detect the strength of the magnetic field from the magnet 120 decreasing, but the accelerometer 165 may not detect any motion of the magnetometer sensor 110, as the magnet 120 may move with the sliding window 720 while the magnetometer sensor 110 remains still on the window frame 710. Negative feedback may be provided to the person installing the opening sensor 100, indicating that they have installed the magnetometer sensor 110 and the magnet 120 on the incorrect portions of the window 700.

Figure 9:
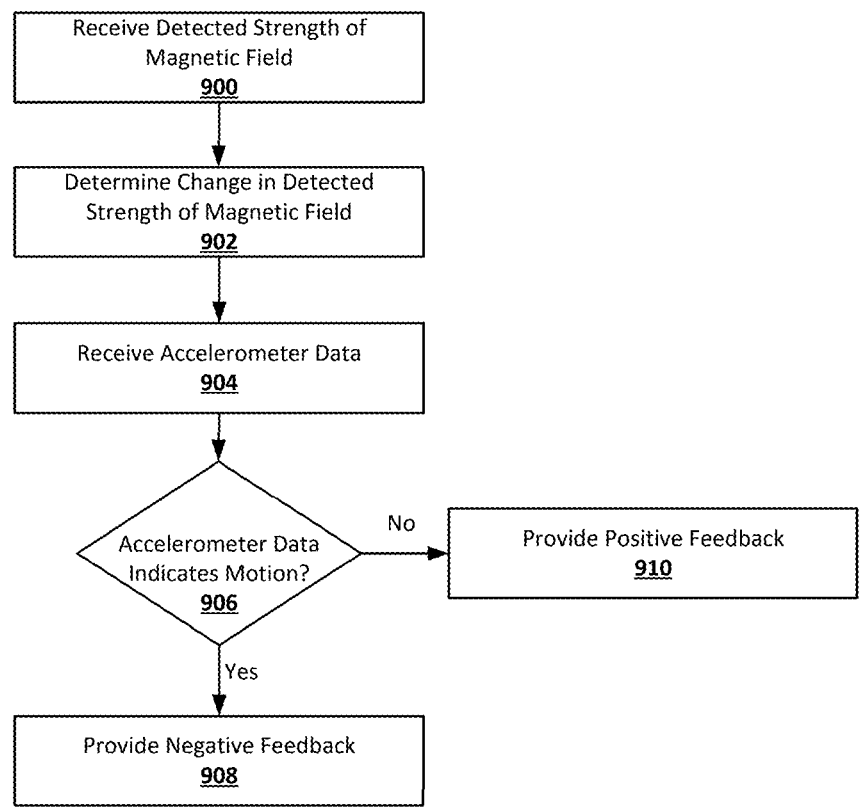
FIG. 9 shows an example of a process suitable for guided installation of an opening sensor according to an implementation of the disclosed subject matter.

FIG. 9 shows an example of a process suitable for guided installation of an opening sensor according to an implementation of the disclosed subject matter. At 900, the detected strength of magnetic field may be received. For example, the magnetometer 155 may detect the strength of the magnetic field from the magnet 120. The detected strength of the magnetic field may be received by the microcontroller 145 of the magnetometer sensor 110, and may also be received by the controller 73, which may be a hub computing device for a smart home environment.

At 902, a change in the detected strength of the magnetic field may be determined. For example, the microcontroller 145, or the controller 73, may determine that the received strength of the magnetic field detected by the magnetometer 155 varies from a previously received detected strength of the magnetic field. The microcontroller 145, or the controller 73, may determine that the variation in the detected strengths of the magnetic field from the magnet 120 indicates that the relative distance between the magnetometer sensor 110 and the magnet 120 has changed, for example, due to either the magnetometer sensor 110 or the magnet 120 being moved.

At 904, accelerometer data may be received. For example, the accelerometer 165 may detect acceleration experienced by the magnetometer sensor 110. The data on acceleration may be received by the microcontroller 145 of the magnetometer sensor 110, and may also be received by the controller 73. The received accelerometer data may coincide temporally with the received detected magnetic field strength.

At 906, whether the accelerometer data indicates motion may be determined. For example, the microcontroller 145, or the controller 73, may analyze the data on acceleration received form the accelerometer 165 to determine whether the magnetometer sensor 110 is moving. For example, if the accelerometer data indicates that the accelerometer 165 is only experiencing gravitational acceleration, then it may be determined that the motion sensor 110 is not moving. If the accelerometer data indicates that the accelerometer 165 is experiencing acceleration other than gravitational acceleration, then it may be determined that the motion sensor 110 is moving. If the accelerometer data indicates motion, flow may proceed to 908. Otherwise, if the accelerometer data indicates no motion, flow may proceed to 910.

At 908, negative feedback may be provided. For example, the accelerometer 165 may have detected that the magnetometer sensor 110 is moving while the magnetometer 155 detects a change in the detected magnetic field strength. This may indicate that the person installing the opening sensor 100 is moving the magnetometer sensor 110, instead of the magnet 120, which may be incorrect. Negative feedback, such as, for example, a red light on the LED of the magnetometer sensor 110, or written, verbal, or other feedback on a speaker or screen that is connected to the opening sensor 100 or part of the smart home environment, may be provided to the person installing the opening sensor 100, so that they may correct their installation.

At 910, positive feedback may be provided. For example, the accelerometer 165 may have detected that the magnetometer sensor 110 is not moving while the magnetometer 155 detects a change in the detected magnetic field strength. This may indicate that the person installing the opening sensor 100 is moving the magnet 120, which may be correct. Positive feedback, such as, for example, a green light on the LED of the magnetometer sensor 110, or written, verbal, or other feedback on a speaker or screen that is connected to the opening sensor 100 or part of the smart home environment, may be provided to the person installing the opening sensor 100, so that they may correct their installation.

Figure 10:
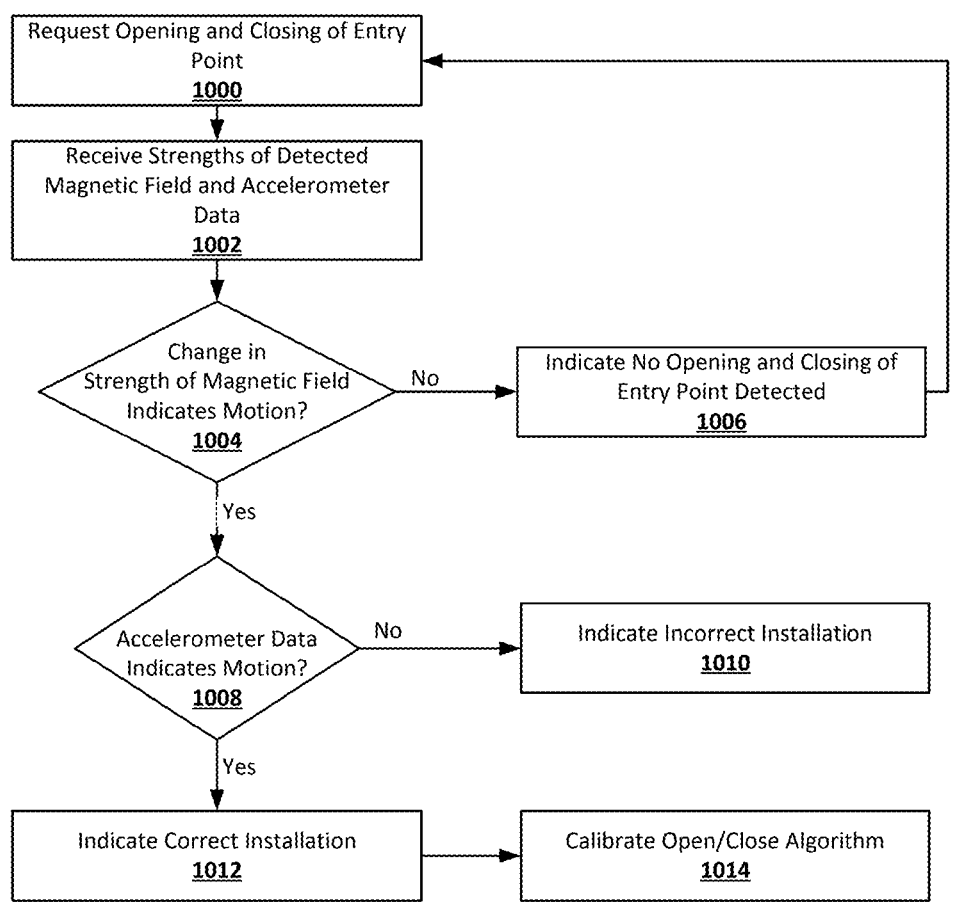
FIG. 10 shows an example of a process suitable for guided installation of an opening sensor according to an implementation of the disclosed subject matter.

FIG. 10 shows an example of a process suitable for guided installation of an opening sensor according to an implementation of the disclosed subject matter. At 1000, the opening and closing of an entry point may be requested. For example, after the person installing the opening sensor 100 to the entry point 200 has affixed both the magnetometer sensor 110 and the magnet 120, they may be requested to open and close the entry point 200. The request may be made using and suitable speaker, screen, or other form of communication connected to the opening sensor 100 or the smart home environment. For example, person installing the opening sensor 100 may see a request to open and close the door 220 of the entry point 200.

At 1002, detected strengths of the magnetic field and accelerometer data may be received. For example, the magnetometer 155 may report detected magnetic field strengths, for example, of the magnetic field from the magnet 120, for a time period after the request to open the entry point 200 is made. The accelerometer 165 may report acceleration experienced by the magnetometer sensor 110 over the same time period. The detected magnetic field strengths and accelerometer data may be received by the microcontroller 145, and may also be received by the controller 73.

At 1004, whether the entry point was opened or closed may be determined based on a change in the detected magnetic field strengths. For example, the magnetometer 155 may report detected magnetic field strengths for a time period after the request to open the entry point 200 is made. The microcontroller 145, or the controller 73, may receive the detected magnetic field strengths, and may determine if the detected magnetic field strengths indicate that the entry point 200 is being opened and closed, based on changes in the detected magnetic field strengths over time. For example, if the detected magnetic field strengths decrease, then increase, this may indicate the entry point 200 was opened and closed, and flow may proceed to 1008. Otherwise, if the changes in the detected magnetic field strengths indicate that the entry point 200 was not opened and closed, flow may proceed to 1006.

At 1006, that no opening and closing of the entry point was detected may be indicated. For example, any suitable speaker or screen connected to the opening sensor 100 or the smart home environment may indicate, visually or audibly, that the entry point 200 was not opened and closed. Flow may proceed back to 1000, where the person installing the opening sensor 200 may again be requested to open and close the entry point 200.

At 1008, whether accelerometer data indicates motion may be determined. For example, if the data from the accelerometer 165 indicates that the magnetometer sensor 110 only experienced gravity during the time period that the entry point was being opened and closed, this may indicate that the magnetometer sensor 110 was not moving, and flow may proceed to 1010. Otherwise, if the accelerometer data indicates that the magnetometer sensor 110 was moving, flow may proceed to 1012.

At 1010, that the installation was incorrect may be indicated. For example, any suitable visual or audible indication may be given to the person installing the opening sensor 100 that they have installed the opening sensor 100 incorrectly, as the magnetometer sensor 110 may be affixed to the static portion of the entry point 200. The indication may include, for example, a request that the person reinstall the opening sensor 100.

At 1012, that the installation was correct may be indicated. For example, any suitable visual or audible indication may be given to the person installing the opening sensor 100 that they have installed the opening sensor 100 correctly, as the magnetometer sensor 110 may be affixed to the moving portion of the entry point 200.

At 1014, the open/close algorithm of the opening sensor 100 may be calibrated. For example, the detected magnetic field strengths from the magnetometer 155 and the data from the accelerometer 165 from the time period during which the entry point 200 was opened and closed may be used to calibrate the open/close algorithm of the opening sensor 100 with respect to the entry point 200. This may allow the opening sensor 100 to be accurate in determining when, and to what degree, the entry point 200 is open or closed.

Figure 11:
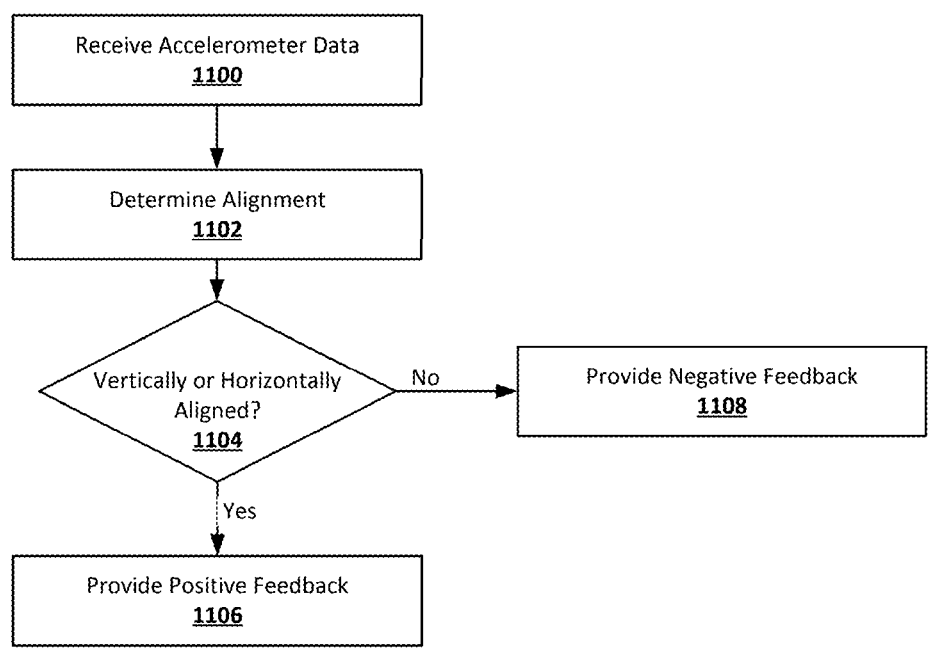
FIG. 11 shows an example of a process suitable for guided installation of an opening sensor according to an implementation of the disclosed subject matter.

FIG. 11 shows an example of a process suitable for guided installation of an opening sensor according to an implementation of the disclosed subject matter. At 1100, accelerometer data may be received. For example, the accelerometer 165 of the magnetometer sensor 110 may detect acceleration experienced by the magnetometer sensor 110. The data on acceleration may be received by the microcontroller 145 of the magnetometer sensor 110, and may also be received by the controller 73.

At 1102, the alignment of the magnetometer sensor may be determined. For example, the acceleration data may be used to determine if the magnetometer sensor 110 has been aligned vertically or horizontally with the floor of the room with the entry point 200. When the magnetometer sensor 110 is not moving, the accelerometer 165 may only experience the force of gravity. If the gravitational force is directed down either the horizontal or vertical axis of the magnetometer sensor 110, then the magnetometer sensor 110 may be aligned vertically or horizontally. Otherwise, if the gravitational force is at an angle to both the vertical and horizontal axis, the magnetometer sensor 110 may not be aligned vertically or horizontally.

At 1104, whether the magnetometer sensor 110 is aligned vertically or horizontally may be determined. If the magnetometer sensor 110 is aligned vertically or horizontally, flow proceeds to 1106. Otherwise, flow proceeds to 1108.

At 1106, positive feedback may be provided. For example, the magnetometer sensor 110 may be aligned properly, either vertically or horizontally. Positive feedback may be provided visually or audibly in any suitable manner, using any suitable screen or speaker connected to the opening sensor 100 or the smart home environment.

At 1108, negative feedback may be provided. For example, the magnetometer sensor 110 may not be aligned properly, and may be at an angle instead of level. Negative feedback may be provided visually or audibly in any suitable manner, using any suitable screen or speaker connected to the opening sensor 100 or the smart home environment. The negative feedback may indicate that the magnetometer sensor 100 is not installed properly, and may request the person installing the opening sensor 100 readjust the magnetometer sensor 100 until it is level. The accelerometer 165 may be used to provide real time feedback as the person adjust the magnetometer sensor 100, acting as a level that may be used by the person to determine when the magnetometer sensor 100 is properly aligned.

Figure 12:
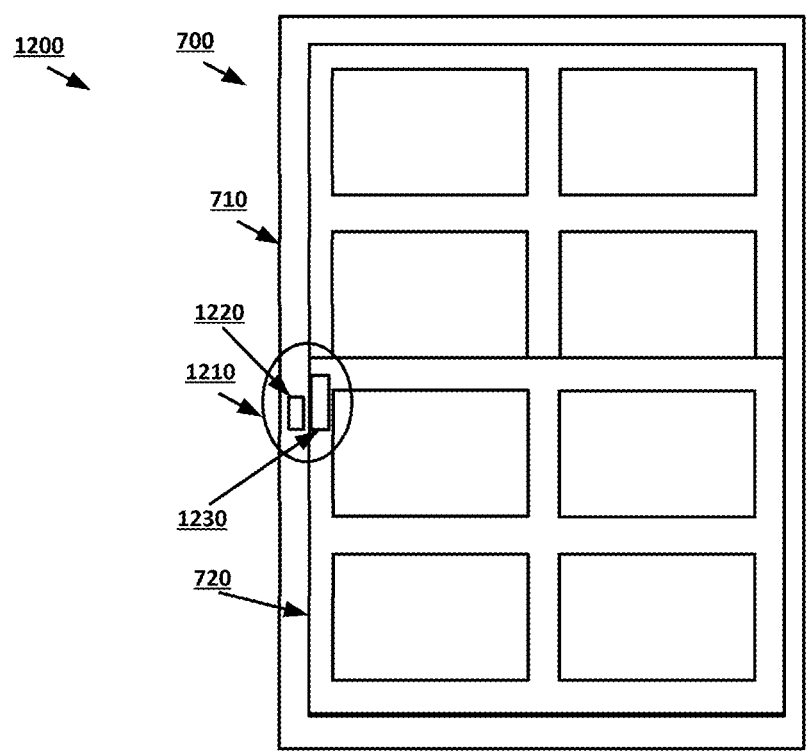
FIG. 12 shows an example of an image with an installation position overlay suitable for guided installation of an opening sensor according to an implementation of the disclosed subject matter.

FIG. 12 shows an example of an image with an installation position overlay suitable for guided installation of an opening sensor according to an implementation of the disclosed subject matter. An image 1200 of the window 700 may be received by, for example, the controller 73 from a camera that may be, for example, part of a smartphone or other computing device used by the person installing the opening sensor 100 or may be part of the smart home environment. Image recognition may be performed on the image 1200, resulting in recognition of the window 700. Customized installation instructions may then be generated for installing the opening sensor 100 on the window 700. The customized installation instructions may include an overlay 1210 on the image 1200 of the window 700, indicating the installation position for the opening sensor 100. The overlay 1210 may include a position 1220 from the magnet 120, and a position 1230 for the magnetometer sensor 110. The overlay 1210 may be used by the person installing the opening sensor 100 to determine where to place the magnet 120 and the magnetometer sensor 110 on the window 700.

Figure 13:
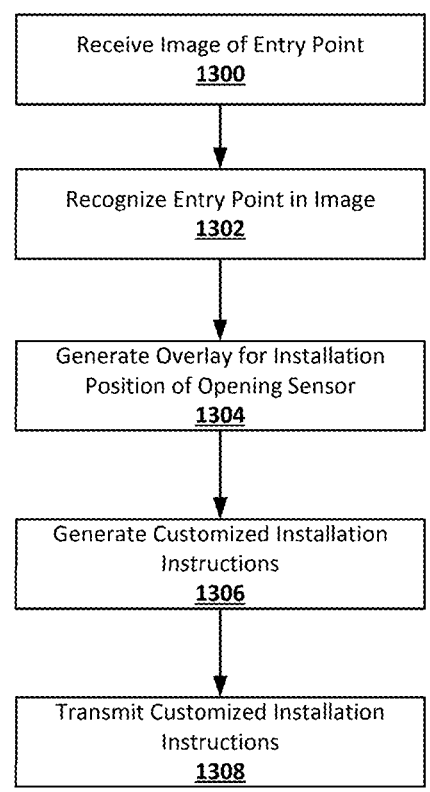
FIG. 13 shows an example of a process suitable for guided installation of an opening sensor according to an implementation of the disclosed subject matter.

FIG. 13 shows an example of a process suitable for guided installation of an opening sensor according to an implementation of the disclosed subject matter. At 1300, an image of an entry point may be received. For example, the image 1200 of the window 700 may be received by the controller 73. The image 1200 may be received from, for example, a camera on a smartphone used by the person installing the opening sensor 100, or a camera connected to the smart home environment.

At 1302, the entry point may be recognized in the image. For example, image recognition may be performed on the image 1200, which may result in the recognition of the window 700 as the entry point on which the opening sensor 100 is to be installed. The window 700 may be recognized as a window which opens through the sliding up of the bottom of the window.

At 1304, an overlay for the installation position of the opening sensor may be generated. For example, the overlay 1210 may be generated, identifying the area on the window 700 where the opening sensor 100 should be installed. The overlay 1210 may include a position 1220 for the magnet 120, and a position 1230 for the magnetometer sensor 110. The overlay 1210 may be combined with the image 1200, so that the person installing the opening sensor 100 can see where they should place the components of the opening sensor 100 on the siding window 700.

At 1306, customized installation instructions may be generated. For example, the customized installation instructions may be step-by-step instructions for the installation of the opening sensor 100 on the window 700 recognized in the image 1200. The instructions may include, for example, steps to affix the magnetometer sensor 110, find the optimal position for the magnet 120, affix the magnet 120, and calibrate the opening sensor 100.

At 1308, the customized installation instructions may be transmitted. For example, the controller 73 may transmit the customized installation instructions to a smartphone or other computing device of the person performing the installation, or to displays or speakers connected to the smart home environment. During performance of the installation, the magnetometer 155 and the accelerometer 165 may be checked to determine if the person installing the opening sensor 100 is complying with the instructions, and to provide feedback to guide them through installation. For example, the magnetometer 155 and accelerometer 165 may be used to determine if the person affixes the magnetometer sensor 110 before positioning the magnet 120, if the person complies with a request to open and close the entry point 200, if the magnetometer sensor 110 is affixed to the moving portion of the entry point 200, and if the magnetometer sensor 110 is affixed in a level position, either vertically aligned, for example, on the sliding window 720 of the window 700, or the horizontally aligned, for example, on the door 220 of the entry point 200.

Implementations disclosed herein may use one or more sensors. In general, a "sensor" may refer to any device that can obtain information about its environment. Sensors may be described in terms of the type of information they collect. For example, sensor types as disclosed herein may include motion, smoke, carbon monoxide, proximity, temperature, time, physical orientation, acceleration, location, entry, presence, pressure, light, sound, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment as disclosed herein. For example, a sensor may operate as a security sensor when it is used to determine security events such as unauthorized entry. A sensor may operate with different functions at different times, such as where a motion sensor is used to control lighting in a smart home environment when an authorized user is present, and is used to alert to unauthorized or unexpected movement when no authorized user is present, or when an alarm system is in an away (e.g., "armed") state, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor, a sensor device, or a sensor package. For clarity, sensors are described with respect to the particular functions they perform and/or the particular physical hardware used, when such specification is necessary for understanding of the embodiments disclosed herein.

Figure 16:
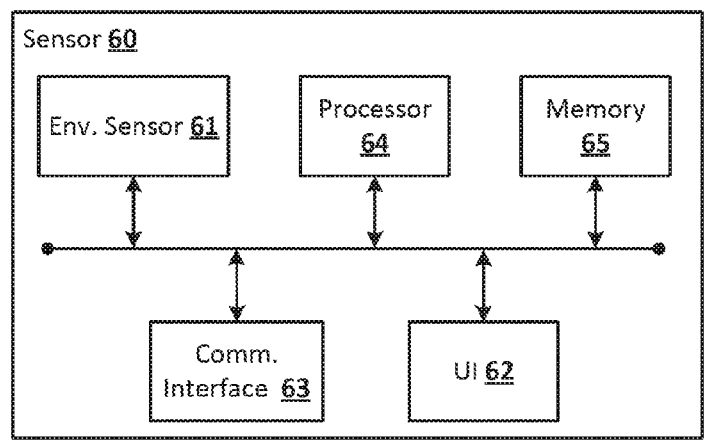
FIG. 16 shows an example sensor as disclosed herein.

A sensor may include hardware in addition to the specific physical sensor that obtains information about the environment. FIG. 16 shows an example sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, pressure sensor, microphone, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices. A user interface (UI) 62 may provide information and/or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a liquid crystal display (LCD), light-emitting diode (LED) display, or limited-output display, or it may be a full-featured interface such as a touchscreen. Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

As a specific example, a sensor may include a compass and/or an accelerometer as illustrated by FIGS. 1-12 and described in further detail with respect to FIGS. 1-12.

In some configurations, two or more sensors may generate data that can be used by a processor of a system to generate a response and/or infer a state of the environment. For example, an ambient light sensor in a room may determine that the room is dark (e.g., less than 60 lux). A microphone in the room may detect a sound above a set threshold, such as 60 dB. The system processor may determine, based on the data generated by both sensors that it should activate one or more lights in the room. In the event the processor only received data from the ambient light sensor, the system may not have any basis to alter the state of the lighting in the room. Similarly, if the processor only received data from the microphone, the system may lack sufficient data to determine whether activating the lights in the room is necessary, for example, during the day the room may already be bright or during the night the lights may already be on. As another example, two or more sensors may communicate with one another. Thus, data generated by multiple sensors simultaneously or nearly simultaneously may be used to determine a state of an environment and, based on the determined state, generate a response.

Data generated by one or more sensors may indicate a behavior pattern of one or more users and/or an environment state over time, and thus may be used to "learn" such characteristics. For example, data generated by an ambient light sensor in a room of a house and the time of day may be stored in a local or remote storage medium with the permission of an end user. A processor in communication with the storage medium may compute a behavior based on the data generated by the light sensor. The light sensor data may indicate that the amount of light detected increases until an approximate time or time period, such as 3:30 PM, and then declines until another approximate time or time period, such as 5:30 PM, at which point there is an abrupt increase in the amount of light detected. In many cases, the amount of light detected after the second time period may be either below a dark level of light (e.g., under or equal to 60 lux) or bright (e.g., equal to or above 400 lux). In this example, the data may indicate that after 5:30 PM, an occupant is turning on/off a light as the occupant of the room in which the sensor is located enters/leaves the room. At other times, the light sensor data may indicate that no lights are turned on/off in the room. The system, therefore, may learn that occupants patterns of turning on and off lights, and may generate a response to the learned behavior. For example, at 5:30 PM, a smart home environment or other sensor network may automatically activate the lights in the room if it detects an occupant in proximity to the home. In some embodiments, such behavior patterns may be verified using other sensors. Continuing the example, user behavior regarding specific lights may be verified and/or further refined based upon states of, or data gathered by, smart switches, outlets, lamps, and the like.

Sensors as disclosed herein may operate within a communication network, such as a conventional wireless network, a mesh network (e.g., Thread), and/or a sensor-specific network through which sensors may communicate with one another and/or with dedicated other devices. In some configurations, one or more sensors may provide information to one or more other sensors, to a central controller, or to any other device capable of communicating on a network with the one or more sensors. A central controller may be general- or special-purpose. For example, one type of central controller is a home automation network, that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Figure 17:
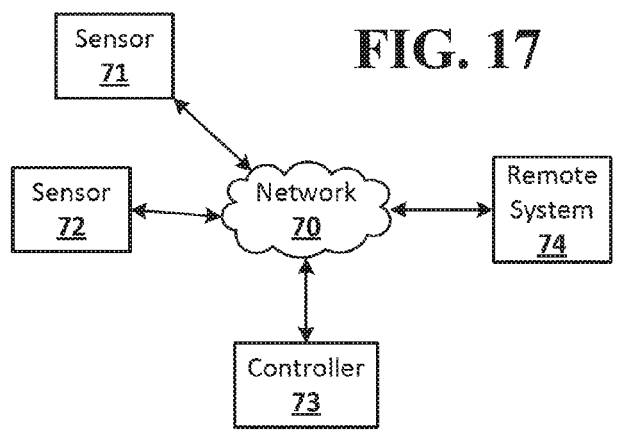
FIG. 17 shows an example of a sensor network as disclosed herein.

FIG. 17 shows an example of a sensor network as disclosed herein, which may be implemented over any suitable wired and/or wireless communication networks. One or more sensors 71, 72 may communicate via a local network 70, such as a Wi-Fi or other suitable network, with each other and/or with a controller 73. The controller may be a general- or special-purpose computer such as a smartphone, a smartwatch, a tablet, a laptop, etc. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. In some configurations, the system may have multiple controllers 74 such as where multiple occupants' smartphones and/or smartwatches are authorized to control and/or send/receive data to or from the various sensors 71, 72 deployed in the home. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

The sensor network shown in FIG. 17 may be an example of a smart-home environment. The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space.

The smart home environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIG. 17 may include a plurality of devices, including intelligent, multi-sensing, network-connected devices, that can integrate seamlessly with each other and/or with a central server or a cloud-computing system (e.g., controller 73 and/or remote system 74) to provide home-security and smart-home features. The controller may determine an intensity level of illumination for lights connected to the smart home system and/or a color or temperature for the lights. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entry point interface devices (e.g., "smart doorbells"). The smart hazard detectors, smart thermostats, and smart doorbells may be the sensors 71, 72 shown in FIG. 17.

For example, a smart thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIG. 17, and the controller 73 may control the HVAC system (not shown) of the structure.

As another example, a smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 17, and the controller 73 may control an alarm system to provide a visual and/or audible alarm to the user of the smart-home environment.

As another example, a smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some embodiments, the smart-home environment of the sensor network shown in FIG. 17 may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 71, 72 shown in FIG. 17. A smart wall switch may detect ambient lighting conditions, and control a power and/or dim state of one or more lights. For example, a sensor such as sensors 71, 72, may detect ambient lighting conditions, and a device such as the controller 73 may control the power to one or more lights (not shown) in the smart-home environment. Smart wall switches may also control a power state or speed of a fan, such as a ceiling fan. For example, sensors 72, 72 may detect the power and/or speed of a fan, and the controller 73 may adjust the power and/or speed of the fan, accordingly. Smart wall plugs may control supply of power to one or more wall plugs (e.g., such that power is not supplied to the plug if nobody is detected to be within the smart-home environment). For example, one of the smart wall plugs may control supply of power to a lamp (not shown).

In embodiments of the disclosed subject matter, a smart-home environment may include one or more intelligent, multi-sensing, network-connected entry detectors (e.g., "smart entry detectors"). Such detectors may be or include one or more of the sensors 71, 72 shown in FIG. 17. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not be placed in an away mode (e.g., "armed") unless all smart entry detectors (e.g., sensors 71, 72) indicate that all doors, windows, entry points, and the like are closed and/or that all smart entry detectors are in an away mode. In some configurations, the system may arm if it can be determined that the distance the door (or window) is ajar is insubstantial (e.g., the opening is not wide enough for a person to fit through).

The smart-home environment of the sensor network shown in FIG. 17 can include one or more intelligent, multi-sensing, network-connected doorknobs (e.g., "smart doorknob"). For example, the sensors 71, 72 may be coupled to a doorknob of a door (e.g., doorknobs 122 located on external doors of the structure of the smart-home environment). However, it should be appreciated that smart doorknobs can be provided on external and/or internal doors of the smart-home environment.

The smart thermostats, the smart hazard detectors, the smart doorbells, the smart wall switches, the smart wall plugs, the smart entry detectors, the smart doorknobs, the keypads, and other devices of a smart-home environment (e.g., as illustrated as sensors 71, 72 of FIG. 17) can be communicatively coupled to each other via the network 70, and to the controller 73 and/or remote system 74 to provide security, safety, and/or comfort for the smart home environment.

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, a tablet, a key FOB, or the like). A webpage or application can be configured to receive communications from the user and control the one or more of the network-connected smart devices based on the communications and/or to present information about the device's operation to the user. For example, the user can view or change the mode of the security system of the home.

One or more users can control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment may "learn" who is a user (e.g., an authorized user) and permit the electronic devices associated with those individuals to control the network-connected smart devices of the smart-home environment (e.g., devices communicatively coupled to the network 70), in some embodiments including sensors used by or within the smart-home environment. Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

A smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected smart devices in the smart-home environment. For example, in the event that any of the network-connected smart devices, such as smart wall plugs located outdoors, detect movement at nighttime, the controller 73 and/or remote system 74 can activate the outdoor lighting system and/or other lights in the smart-home environment.

Figure 18:
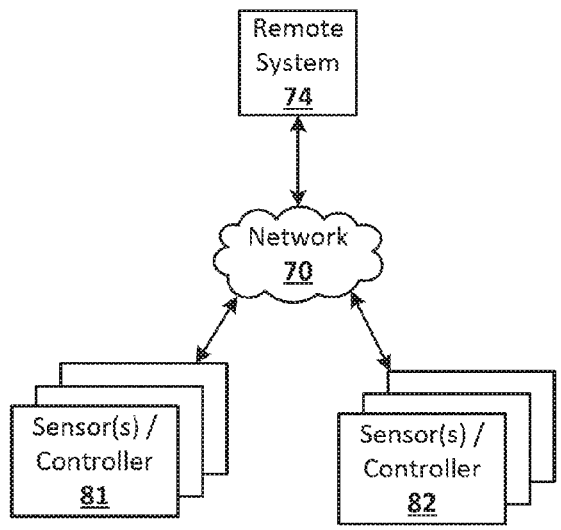
FIG. 18 shows an example configuration of sensors, one or more controllers, and a remote system as disclosed herein.

In some configurations, a remote system 74 may aggregate data from multiple locations, such as multiple buildings, multi-resident buildings, and individual residences within a neighborhood, multiple neighborhoods, and the like. In general, multiple sensor/controller systems 81, 82 as previously described with respect to FIG. 17 may provide information to the remote system 74 as shown in FIG. 18. The systems 81, 82 may provide data directly from one or more sensors as previously described, or the data may be aggregated and/or analyzed by local controllers such as the controller 73, which then communicates with the remote system 74. The remote system may aggregate and analyze the data from multiple locations, and may provide aggregate results to each location. For example, the remote system 74 may examine larger regions for common sensor data or trends in sensor data, and provide information on the identified commonality or environmental data trends to each local system 81, 82.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. As another example, systems disclosed herein may allow a user to restrict the information collected by the systems disclosed herein to applications specific to the user, such as by disabling or limiting the extent to which such information is aggregated or used in analysis with other information from other users. Thus, the user may have control over how information is collected about the user and used by a system as disclosed herein.

Figure 14:
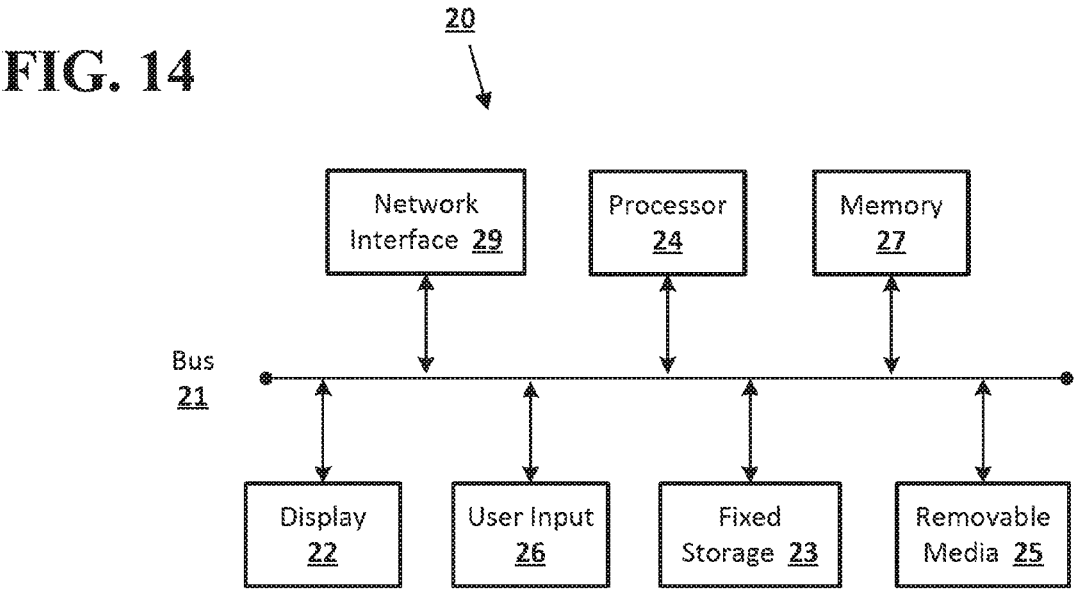
FIG. 14 shows a computer according to an implementation of the disclosed subject matter.

Implementations of the presently disclosed subject matter may be implemented in and used with a variety of component and network architectures. FIG. 14 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection, or the like. For example, the network interface 29 may allow the computer to communicate with other computers via one or more local, wide-area, or other networks, as shown in FIG. 15.

Many other devices or components (not shown) may be connected in a similar manner (e.g., document scanners, digital cameras, and so on). Conversely, all of the components shown in FIG. 14 need not be present to practice the present disclosure. The components can be interconnected in different ways from that shown. The operation of a computer such as that shown in FIG. 14 is readily known in the art and is not discussed in detail in this application. Code to implement the present disclosure can be stored in computer-readable storage media such as one or more of the memory 27, fixed storage 23, removable media 25, or on a remote storage location.

Figure 15:
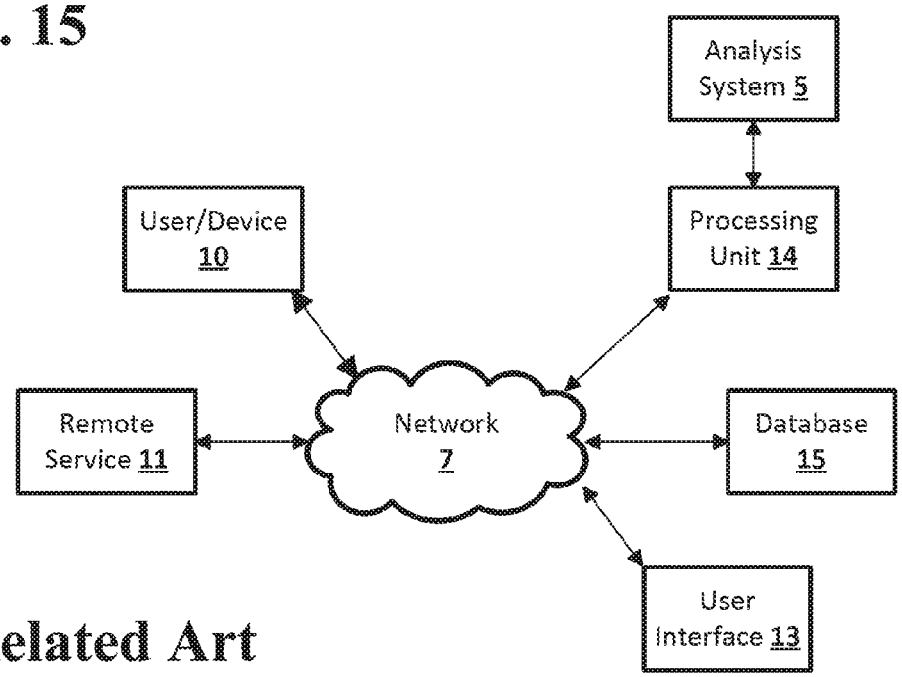
FIG. 15 shows a network configuration according to an implementation of the disclosed subject matter.

FIG. 15 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. The disclosed subject matter also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions.

Implementations may use hardware that includes a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method performed by a data processing apparatus, the method comprising:
   receiving detected magnetic field strengths of a magnetic field created by a magnet of an opening sensor as detected by a magnetometer sensor of the opening sensor over a time period;
   determining that there has been a change in the strength of the magnetic field created by the magnet as detected by the magnetometer sensor based on the received detected magnetic field strengths during the time period;
   receiving accelerometer data from an accelerometer disposed in the magnetometer sensor over the time period; and
   determining from the accelerometer data that the magnetometer sensor was not moving during the time period and providing positive feedback to an installer of the opening sensor, or
   determining from the accelerometer data that the magnetometer sensor was moving during the time period and providing negative feedback to the installer of the opening sensor.

2. The computer-implemented method of claim 1, further comprising:
   transmitting an indication to the installer of the opening sensor to open and close an entry point on which the opening sensor is installed;
   receiving detected magnetic field strengths of the magnetic field created by the magnet of the opening sensor as detected by the magnetometer sensor of the opening sensor over a second time period;
   determining that there has been no change in the strength of a magnetic field created by the magnet as detected by the magnetometer sensor based on the received detected magnetic field strengths over the second time period; and
   re-transmitting the indication to the installer of the opening sensor to open and close an entry point on which the opening sensor is installed.

3. The computer-implemented method of claim 1, further comprising:
- transmitting an indication to the installer of the opening sensor to open and close an entry point on which the opening sensor is installed;
- receiving detected magnetic field strengths of the magnetic field created by the magnet of the opening sensor as detected by a magnetometer sensor of the opening sensor over a second time period;
- determining that there has been a change in the strength of a magnetic field created by the magnet as detected by the magnetometer sensor based on the received detected magnetic field strengths over the second time period;
- receiving accelerometer data from the accelerometer disposed in the magnetometer sensor over the second time period; and
  - determining from the accelerometer data that the magnetometer sensor was not moving during the second time period and providing negative feedback to an installer of the opening sensor, or
  - determining from the accelerometer data that the magnetometer sensor was moving during the time period, providing positive feedback to the installer of the opening sensor, and calibrating the opening sensor based on the detected magnetic field strengths over the second time period.

4. The computer-implemented method of claim 1, further comprising:
- receiving accelerometer data from the accelerometer disposed in the magnetometer sensor;
- determining an alignment of the magnetometer sensor based on the accelerometer data; and
- providing negative feedback to the installer of the opening sensor if the alignment of the magnetometer sensor is not vertical or horizontal, or
- providing positive feedback to the installer of the opening sensor if the alignment of the magnetometer sensor is vertical or horizontal.

5. The computer-implemented method of claim 1, further comprising:
- receiving an image including an image of entry point;
- identifying the location of the image of the entry point within the image and the type of entry point depicted by the image of the entry point;
- generating an overlay on the image indicating an installation location for an opening sensor on the entry point;
- generating customized installation instructions based on the identified type of the entry point; and
- transmitting the customized installation instructions and the image with the overlay.

6. The computer-implemented method of claim 4, further wherein positive feedback is provided only when:
- the opening sensor is installed on a door and the magnetometer sensor is horizontally aligned, or
- the opening sensor is installed on a window and the magnetometer sensor is vertically aligned.

7. The computer-implemented method of claim 4, wherein the accelerometer data comprises the acceleration forces experienced by the accelerometer, and wherein the magnetometer sensor is vertically aligned when the acceleration forces experienced by the accelerometer are gravitational forces down a long axis of the magnetometer sensor, and wherein the magnetometer sensor is horizontally aligned when the acceleration forces experienced by the accelerometer are gravitational forces down a short axis of the magnetometer sensor.

8. The computer-implemented method of claim 1, wherein the negative feedback comprises an indication to the installer of the opening sensor to affix the magnetometer sensor and adjust the magnet.

9. The computer-implemented method of claim 1, wherein the negative feedback and the positive feedback are provided over a computing device connected to one or more of the opening sensor and a smart home environment of which the opening sensor is a component.

10. The computer-implemented method of claim 3, wherein the negative feedback comprises an indication that the installer of the opening sensor has installed the magnetometer sensor on a fixed portion of the entry point.

11. The computer-implemented method of claim 3, wherein determining that there has been a change in the strength of a magnetic field created by the magnet as detected by the magnetometer sensor based on the received detected magnetic field strengths over the second time period further comprises:
- determining that the detected magnetic field strengths decreased over a first part of the second time period; and
- determining that the detected magnetic field strengths increased over a second part of the second time period.

12. The computer-implemented method of claim 2, wherein determining that there has been a change in the strength of a magnetic field created by the magnet as detected by the magnetometer sensor based on the received detected magnetic field strengths over the second time period is based on a generic open/close algorithm for the entry point.

13. The computer-implemented method of claim 5, wherein the overlay further comprises an indicated location on the image for the installation of the magnetometer sensor and an indicated location on the image for the installation of the magnet.

14. The computer-implemented method of claim 5, wherein identifying the location of the image of the entry point within the image and the type of entry point depicted by the image of the entry point further comprises performing image recognition on the image of the entry point.

15. A computer-implemented system for guided installation of an opening sensor comprising:
- a magnetometer of magnetometer sensor adapted to detect a magnetic field from a magnet;
- an accelerometer of the magnetometer sensor adapted to detect acceleration forces;
- a feedback device adapted to provide feedback; and
- a processor adapted to:
  - receive detected magnetic field strengths of a magnetic field created by the magnet as detected by the magnetometer over a time period, determine that there has been a change in the strength of the magnetic field created by the magnet as detected by the magnetometer based on the received detected magnetic field strengths, receive accelerometer data from the accelerometer over the time period, and determine from the accelerometer data that the magnetometer sensor was not moving during the time period and providing positive feedback to an installer of the opening sensor on the feedback device, and determine from the accelerometer data that the magnetometer sensor was moving during the time period and providing negative feedback to the installer of the opening sensor.

16. The computer-implemented system of claim 15, wherein the processor is further adapted to transmit an indication to the installer of the opening sensor to open and close an entry point on which the opening sensor is installed, receive detected magnetic field strengths of the magnetic field created by the magnet of the opening sensor as detected by the magnetometer over a second time period, determine that there has been no change in the strength of a magnetic field created by the magnet as detected by the magnetometer based on the received detected magnetic field strengths over the second time period, and re-transmit, using the feedback device, the indication to the installer of the opening sensor to open and close an entry point on which the opening sensor is installed.

17. The computer-implemented system of claim 15, wherein the processor is further adapted to transmit an indication to the installer of the opening sensor to open and close an entry point on which the opening sensor is installed, receive detected magnetic field strengths of the magnetic field created by the magnet of the opening sensor as detected by the magnetometer over a second time period, determining that there has been a change in the strength of a magnetic field created by the magnet as detected by the magnetometer sensor based on the received detected magnetic field strengths over the second time period, receive accelerometer data from the accelerometer disposed in the magnetometer sensor over the second time period, determine from the accelerometer data that the magnetometer sensor was not moving during the second time period and provide negative feedback to an installer of the opening sensor, and determine from the accelerometer data that the magnetometer sensor was moving during the time period, provide positive feedback to the installer of the opening sensor, and calibrate the opening sensor based on the detected magnetic field strengths over the second time period.

18. The computer-implemented system of claim 15, wherein the processor is further adapted to receive accelerometer data from the accelerometer, determine an alignment of the magnetometer sensor based on the accelerometer data, provide negative feedback to the installer of the opening sensor if the alignment of the magnetometer sensor is not vertical or horizontal, and provide positive feedback to the installer of the opening sensor if the alignment of the magnetometer sensor is vertical or horizontal.

19. The computer-implemented system of claim 15, wherein the processor is further adapted to receive an image including an image of entry point, identify the location of the image of the entry point within the image and the type of entry point depicted by the image of the entry point, generate an overlay on the image indicating an installation location for an opening sensor on the entry point, generate customized installation instructions based on the identified type of the entry point, transmit the customized installation instructions and the image with the overlay.

20. The computer-implemented system of claim 15, wherein the processor is a component of controller for a smart home environment.

21. The computer-implemented system of claim 15, wherein the processor is a microcontroller for the magnetometer sensor.

22. The computer-implemented system of claim 15, wherein the feedback device comprises one or more of a screen, a speaker, a buzzer, and an LED.

23. The computer-implemented system of claim 19, wherein the processor is further adapted to perform image recognition on the image of the entry point to identify the location of the image of the entry point within the image and the type of entry point depicted by the image of the entry point.

24. A system comprising: one or more computers and one or more storage devices storing instructions which are operable, when executed by the one or more computers, to cause the one or more computers to perform operations comprising:
receiving detected magnetic field strengths of a magnetic field created by a magnet of an opening sensor as detected by a magnetometer sensor of the opening sensor over a time period;
determining that there has been a change in the strength of a magnetic field created by the magnet as detected by the magnetometer sensor based on the received detected magnetic field strengths;
receiving accelerometer data from an accelerometer disposed in the magnetometer sensor over the time period; and
determining from the accelerometer data that the magnetometer sensor was not moving during the time period and providing positive feedback to an installer of the opening sensor, or
determining from the accelerometer data that the magnetometer sensor was moving during the time period and providing negative feedback to the installer of the opening sensor.

25. The system of claim 24, wherein the instructions further cause the one or more computers to perform operations comprising:
transmitting an indication to the installer of the opening sensor to open and close an entry point on which the opening sensor is installed;
receiving detected magnetic field strengths of the magnetic field created by the magnet of the opening sensor as detected by the magnetometer sensor of the opening sensor over a second time period;
determining that there has been no change in the strength of a magnetic field created by the magnet as detected by the magnetometer sensor based on the received detected magnetic field strengths over the second time period; and
re-transmitting the indication to the installer of the opening sensor to open and close an entry point on which the opening sensor is installed.

26. The system of claim 24, wherein the instructions further cause the one or more computers to perform operations comprising:
transmitting a indication to the installer of the opening sensor to open and close an entry point on which the opening sensor is installed;
receiving detected magnetic field strengths of the magnetic field created by the magnet of the opening sensor as detected by a magnetometer sensor of the opening sensor over a second time period;
determining that there has been a change in the strength of a magnetic field created by the magnet as detected by the magnetometer sensor based on the received detected magnetic field strengths over the second time period;
receiving accelerometer data from the accelerometer disposed in the magnetometer sensor over the second time period; and
determining from the accelerometer data that the magnetometer sensor was not moving during the second time period and providing negative feedback to an installer of the opening sensor, or
determining from the accelerometer data that the magnetometer sensor was moving during the time period, providing positive feedback to the installer of the opening sensor, and calibrating the opening sensor based on the detected magnetic field strengths over the second time period.

27. The system of claim 24, wherein the instructions further cause the one or more computers to perform operations comprising:
receiving accelerometer data from the accelerometer disposed in the magnetometer sensor;
determining an alignment of the magnetometer sensor based on the accelerometer data; and
providing negative feedback to the installer of the opening sensor if the alignment of the magnetometer sensor is not vertical or horizontal, or
providing positive feedback to the installer of the opening sensor if the alignment of the magnetometer sensor is vertical or horizontal.

28. The system of claim 24, wherein the instructions further cause the one or more computers to perform operations comprising:
receiving an image including an image of entry point;
identifying the location of the image of the entry point within the image and the type of entry point depicted by the image of the entry point;
generating an overlay on the image indicating an installation location for an opening sensor on the entry point;
generating customized installation instructions based on the identified type of the entry point; and
transmitting the customized installation instructions and the image with the overlay.

29. A computer-implemented method performed by a data processing apparatus, the method comprising:
receiving data from a sensor, wherein the data is associated with the positions of a magnet and a magnetometer sensor over a time period; and
determining from the sensor data that the magnetometer sensor was not moving during the time period and providing positive feedback to an installer of the opening sensor, or
determining from the sensor data that the magnetometer sensor was moving during the time period and providing negative feedback to the installer of the opening sensor.

* * * * *